(12) United States Patent
Mishra et al.

(10) Patent No.: US 9,660,868 B2
(45) Date of Patent: *May 23, 2017

(54) ARCHITECTURE FOR OPERATIONAL SUPPORT SYSTEM

(75) Inventors: Richard Mishra, London (GB); Markus Buchner, Munich (DE); Johnston Harden Graham Glendinning, Bradford-on-Avon (GB); Manfred Geyer, Munich (DE); Adan K. Pope, Riverside, IL (US); David Roy Ettle, Bristol (GB)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 479 days.

This patent is subject to a terminal disclaimer.

(21) Appl. No.: 12/094,265

(22) PCT Filed: Nov. 17, 2006

(86) PCT No.: PCT/GB2006/004298
§ 371 (c)(1),
(2), (4) Date: Jan. 20, 2009

(87) PCT Pub. No.: WO2007/057685
PCT Pub. Date: May 24, 2007

(65) Prior Publication Data
US 2009/0222540 A1 Sep. 3, 2009

(30) Foreign Application Priority Data
Nov. 18, 2005 (GB) .................................. 0523543.7

(51) Int. Cl.
*G06F 15/16* (2006.01)
*H04L 12/24* (2006.01)

(52) U.S. Cl.
CPC .......... *H04L 41/147* (2013.01); *H04L 41/082* (2013.01); *H04L 41/085* (2013.01);
(Continued)

(58) Field of Classification Search
CPC ........ G06Q 10/06; G06Q 10/087; H04Q 9/00; H04L 63/0428; H04L 29/06; H04W 52/50
(Continued)

(56) References Cited

U.S. PATENT DOCUMENTS 5,353,339 A 10/1994 Scobee
5,650,994 A 7/1997 Daley
(Continued)

FOREIGN PATENT DOCUMENTS

EP 1 107 108 6/2001 ............... G06F 9/00
EP 1107 108 6/2001 ............... G06F 9/00
(Continued)

OTHER PUBLICATIONS

International Search Report from PCT Application No. PCT/GB2006/004298 mailed on Jan. 6, 2007.
(Continued)

*Primary Examiner* — Evans Desrosiers
(74) *Attorney, Agent, or Firm* — Zilka-Kotab, PC

(57) ABSTRACT

A network management system for management of a communications network is disclosed. The system comprises an inventory database storing a network inventory comprising information representative of network resources of the communications network. The system comprises means for receiving a change request specifying a modification to be made to the network, and an inventory update component adapted to modify the network inventory in response to the change request. The system also includes an implementation component adapted to access the inventory database, identify modifications made to the network inventory, and trans-
(Continued)

mit configuration data to the network to implement the inventory modifications in the network.

21 Claims, 13 Drawing Sheets

(52) U.S. Cl.
CPC ...... H04L 41/0843 (2013.01); H04L 41/0886 (2013.01); H04L 41/145 (2013.01); H04L 41/5054 (2013.01); H04L 41/0896 (2013.01); H04L 41/5009 (2013.01); H04L 41/5087 (2013.01)

(58) Field of Classification Search
USPC ............... 709/228, 206, 225, 229, 249, 389; 713/168–174, 182–186, 202
See application file for complete search history.

(56) References Cited

U.S. PATENT DOCUMENTS

| | | | | |
|---|---|---|---|---|
| 5,774,689 | A | * | 6/1998 | Curtis ................ H04L 41/0233 370/351 |
| 5,832,503 | A | * | 11/1998 | Malik et al. ................... 709/223 |
| 5,943,244 | A | * | 8/1999 | Crawford et al. ............... 703/13 |
| 6,009,466 | A | * | 12/1999 | Axberg et al. ................ 709/220 |
| 6,233,610 | B1 | * | 5/2001 | Hayball .............. H04L 41/0213 709/223 |
| 6,421,719 | B1 | * | 7/2002 | Lewis ..................... G06F 21/30 709/220 |
| 6,574,661 | B1 | | 6/2003 | Delano et al. |
| 6,611,863 | B1 | | 8/2003 | Banginwar |
| 6,769,024 | B1 | | 7/2004 | Natarajan et al. |
| 6,823,291 | B2 | | 11/2004 | Marsland |
| 6,910,074 | B1 | * | 6/2005 | Amin et al. ................... 709/227 |
| 6,978,301 | B2 | | 12/2005 | Tindal |
| 7,051,087 | B1 | | 5/2006 | Bahl et al. |
| 7,155,479 | B2 | | 12/2006 | Cover et al. |
| 7,278,056 | B2 | | 10/2007 | Hekmatpour |
| 7,315,887 | B1 | * | 1/2008 | Liang ................... G06Q 10/087 235/462.01 |
| 7,320,090 | B2 | | 1/2008 | Coulter, Jr. et al. |
| 7,552,339 | B2 | | 6/2009 | Sayama |
| 8,082,335 | B2 | | 12/2011 | Mishra et al. |
| 2002/0069274 | A1 | | 6/2002 | Tindal et al. |
| 2002/0194323 | A1 | | 12/2002 | Chantrain et al. |
| 2003/0179703 | A1 | | 9/2003 | Levy et al. |
| 2004/0117613 | A1 | | 6/2004 | Edmondson |
| 2004/0153171 | A1 | | 8/2004 | Brandt et al. |
| 2004/0172412 | A1 | | 9/2004 | Files et al. |
| 2005/0177629 | A1 | | 8/2005 | Betge-Brezetz et al. |
| 2005/0264831 | A1 | | 12/2005 | Sayama |
| 2005/0278576 | A1 | | 12/2005 | Hekmatpour |
| 2005/0283664 | A1 | | 12/2005 | Coulter, Jr. et al. |
| 2006/0155865 | A1 | | 7/2006 | Brandt et al. |
| 2007/0100892 | A1 | * | 5/2007 | Kephart et al. ............... 707/200 |
| 2008/0065687 | A1 | | 3/2008 | Coulter, Jr. et al. |
| 2008/0065931 | A1 | | 3/2008 | Coulter, Jr. et al. |
| 2008/0172366 | A1 | | 7/2008 | Hannel et al. |
| 2009/0187969 | A1 | | 7/2009 | DeFord et al. |

FOREIGN PATENT DOCUMENTS

| | | |
|---|---|---|
| GB | 2374687 A | 10/2002 |
| GB | 2403628 A | 1/2005 |
| WO | 0304130 A1 | 5/2003 |
| WO | 03041340 A1 | 5/2003 |
| WO | WO 2004/008283 | 1/2004 |
| WO | WO 2004/010631 | 1/2004 |

OTHER PUBLICATIONS

International Preliminary Report on Patentability from PCT Application No. PCT/GB2006/004298 issued on May 20, 2008.
International Written Opinion from PCT Application No. PCT/GB2006/004298.
Examination Report from UK Application No. GB0811137.9, dated May 10, 2010.
Notice of Allowance and Fee(s) Due from U.S. Appl. No. 11/356,392 dated Aug. 22, 2011.
Non-Final Office Action from U.S. Appl. No. 11/356,392, dated Feb. 1, 2011.
Examination Report from UK Application No. GB0811137.9, dated Dec. 1, 2010.

* cited by examiner

ARCHITECTURE FOR OPERATIONAL SUPPORT SYSTEM

The present application is a continuation-in-part of and claims the priority of a United States patent application filed Feb. 16, 2006 under application Ser. No. 11/356,392, now U.S. Pat. No. 8,082,335, which, in turn, claims the priority of a United Kingdom patent application filed Nov. 18, 2005 under application number 0523543.7, both of which are incorporated herein by reference.

The present invention relates to a network management system for the management of a communications network.

Particular aspects relate to systems and methods of performing network modifications in a telecommunications network, systems and methods for managing a telecommunications network and systems and methods for generating planning data defining changes to a telecommunications network.

To enable management of a network, network management systems (also often referred to as operational support systems) often store a data model representative of the communications network being managed. The model of the network may include, for example, details of the network equipment installed in the network and the connections between equipment. Such a model is also referred to as a network inventory. However, due to the size and complexity of many networks—in particular modern telecommunication networks—discrepancies can often arise between the data model and the actual installed network.

In many cases, the model is obtained at least partly by a process referred to as network discovery, that is to say the automated extraction of information from the network. Such processes can, however, be unreliable. Discrepancies can also arise where changes are made to the network without being recorded correctly in the inventory. Thus, the data in the inventory is often inaccurate and often does not provide a clear view of the actual installed network. However, without a reliable inventory, many processes which rely on the inventory data, such as service provisioning, become less efficient and more error-prone.

The inaccuracy of such inventories can also affect the quality of planning decisions, and lead to the construction of inefficient networks.

Planning decisions are also often based on the analysis of high-level service requirements, from which optimized network configurations are derived. However, it is often difficult to adapt existing network structures to conform to these optimized configurations without simply replacing the existing network structures, which is typically not feasible. Physical movement of equipment is also expensive and can cause damage to the equipment. Many telecommunications operators hence prefer to avoid physical restructuring of existing network resources.

The present invention seeks to alleviate some of these problems.

Accordingly, in a first aspect of the invention, there is provided a network management system for management of a communications network comprising: an inventory database storing a network inventory comprising information representative of network resources (which preferably includes information on network topology) of the communications network; means for receiving a change request specifying a modification to be made to the network; an inventory update component adapted to modify the network inventory in response to the change request; and an implementation component adapted to access the inventory database, identify modifications made to the network inventory, and transmit configuration data to the network to implement the inventory modifications in the network.

The implementation component is preferably adapted to retrieve information relating to the inventory modifications from the inventory database and generate the configuration data in dependence on the retrieved information.

By making network modifications dependent on the data held in the inventory, the inventory, in effect, becomes a controlling entity, controlling the state of the network, rather than being a passive record of it. Using this approach, consistency between the inventory and network can be improved, which can enable fuller and more efficient automation of other processes which use the inventory, such as service provisioning, network repair and service restoration and network planning processes.

The term 'communications network' preferably refers to a network of interconnected devices (and possibly associated software) which provides information and communications functions. In preferred examples, the network is a telecommunications network which provides telecommunications services. Optionally, other types of functions or services may additionally be provided by or using the (tele-)communications network, for example data processing, storage, and retrieval services. Examples of such services include a mailbox, web space, an interactive travel booking system, a multimedia content delivery system or an online game. Such additional services are particular relevant in "next-generation" networks. Instead of a telecommunications network, the invention may also be applied to any suitable type of communications system or information processing system in which communication functionality or services are provided using distributed interconnected devices, for example in a local area network (LAN).

The term "network inventory" preferably refers to an inventory of network resources provided in the network being managed, which may include both physical resources (e.g. devices and connections) and logical resources (e.g. logical ports and bandwidth allocations). The inventory preferably provides a model of the network, though the model need not provide a complete representation of the underlying network structure but may instead be designed to more effectively support network management functions. Thus the model may be in essence a functional rather than a structural model, or may be a combination of both. Preferably, the inventory is highly configurable with regard to these options so that it can be optimally configured to support a specific activity or set of activities in any particular deployment. The inventory or model is typically represented by a data model, preferably stored in a database. This may comprise data entities representing network entities (whether these are abstract/functional, or concrete/structural network entities), the data entities comprising attributes representing characteristics of the network entities. Data entities may, for example, be in the form of tables and table rows in a relational database or objects in an object database, depending on the database technology used.

The term "network resource" preferably refers to tangible/physical or low-level logical/technological entities from which a network is constructed, including, for example, pieces of equipment, devices, components for devices (e.g. cards), facilities of devices or subdivisions thereof (e.g. ports), groups or associations of equipment or devices, connections (e.g. cables), support structures (e.g. ducts), software executing on devices, or low-level logical entities (e.g. timeslots, files or other storage space assignments). A grouping of network resources may itself be a network resource (for example, an exchange may be viewed as a network resource). Thus, the network model may represent network resources in a hierarchical manner.

The system (preferably the inventory update component, or alternatively the database itself) is preferably adapted to generate one or more change records identifying modifications made to the network inventory, and the network implementation component is preferably adapted to receive the change records and identify the inventory modifications in dependence on the change records.

This can assist the network implementation component in identifying where changes have been made to the inventory and can thus improve efficiency. The change records preferably specify inventory entities that have been modified by the inventory update component, the network implementation component being adapted to access the specified inventory entities in the database and retrieve information relating to those entities from the database.

The inventory update component is preferably adapted to select one of a plurality of stored scripts in dependence on the change request, each script specifying inventory modification actions for performing a given modification, and executing the modification actions specified by the selected script in the inventory database. This can simplify the processing of change requests. The change request may relate to changes requiring external action in addition to inventory updates, in which case the system preferably comprises means for interfacing with one or more external systems for carrying out the required external action. This can increase the scope of the activities supported, provide greater flexibility and enable more efficient implementation of network changes.

The network implementation component is preferably adapted to receive a plurality of change records generated in response to one or more change requests, to access the inventory database and identify inventory modifications in dependence on the plurality of change records, and to generate a set of network configuration actions corresponding to the identified inventory modifications. The network implementation component thus preferably processes change records in batches. This can improve efficiency. Preferably, the network implementation component is adapted to combine two or more related network modifications into the same network configuration action. This can reduce disruption caused by network configuration activities. The network implementation component is preferably adapted to combine at least two network modifications relating to the same network resource or device into a single network configuration action relating to that resource or device. The configuration actions preferably comprise or are in the form of configuration commands for network devices, the implementation component being adapted to transmit the configuration commands to the devices. This can enable automatic implementation of changes in the network.

The system is preferably adapted to receive change requests from one or more network management applications, which may comprise one or more of: a network design application, a network resource management application, a network planning application, a network reporting application, and a service provisioning application.

Preferably, the inventory provides a model of the network, the model defining network entities, attributes of network entities and connections between network entities, the system further comprising an interface for receiving inventory update requests expressed in terms of the model and issuing database update requests corresponding to the inventory update requests to the database. In this way, the data implementation (i.e. the data structures and database technology used) can be hidden from the remainder of the system.

In a further aspect the invention provides a method of managing a network, comprising: storing a network inventory comprising information representative of network resources of the communications network (which preferably includes network topology information); receiving a change request specifying a modification to be made to the network; modifying the network inventory in response to the change request; accessing the network inventory to identify modifications made to the network inventory; and implementing the identified modification in the network. Implementing the identified modifications preferably comprises: transmitting configuration data to the network to implement the inventory modifications in the network. Implementing the identified modifications may comprise one or more of: installing new equipment in the network; connecting network devices; and configuring network devices. The method may further comprise steps corresponding to the activities performed by the network management system as set out above.

In a further aspect, the invention provides a method of performing network modifications in a communications network, comprising: receiving a plurality of change requests each specifying a modification to be made to the network; identifying, for each change request, one or more modification actions required for implementing the modification specified by the change request in the network; analysing the modification actions identified for the plurality of change requests to identify at least two modification actions relating to the same network resource; determining a network configuration action for configuring the network resource so as to implement the at least two modification actions in the network; and performing the network configuration action in the network.

In this way, multiple modification actions can be carried out in a single configuration action. Network configuration can thereby be performed more efficiently, and disruption to the network can be reduced. This method may also be used with the system and methods set out above. For example, a network inventory may be provided, and the modification actions may be inventory update actions for updating the inventory to implement the modification specified in the change request in the inventory. The method may then also comprise performing the identified inventory update actions. The analysing step is then preferably performed in relation to the identified or performed inventory update actions.

Accordingly, in a further aspect, the invention provides a method of performing network modifications in a communications network, comprising: storing a network inventory comprising information representative of network resources of the communications network; receiving a plurality of change requests each specifying a modification to be made to the network; identifying, for each change request, one or more inventory update actions required for implementing the modification specified by the change request in the network inventory, and performing the identified inventory update actions to implement the modification in the network inventory; analysing the inventory update actions performed for the plurality of change requests to identify two or more update actions relating to the same network resource; determining a network configuration action for configuring the network resource so as to implement the two or more update actions in the network; and performing the network configuration action in the network.

Preferably, analysing the modification or inventory update actions comprises identifying a plurality of groups of actions, each group of actions relating to a respective network resource; the method further comprising: determining, for each group of actions, a network configuration action for configuring the respective network resource so as to implement the group of actions in the network; and performing the determined network configuration actions (that is to say, each action) in the network. In this way, modification or inventory update actions may be grouped so as to allow for more efficient implementation in the network. For example, repeated access to a given network resource can be avoided, and the amount of configuration traffic in the network can be reduced. Instead of grouping actions by network resource, actions which are related in some other way may be grouped. Generally speaking, the method may group actions which can be implemented by a single configuration action, and then generate the configuration action for each group, to thereby improve configuration efficiency. For example, actions relating to the same external system could be grouped, allowing a single configuration message to be transmitted to the external system. As a further example, the network resource may be an exchange, with manual maintenance activities relating to that exchange being grouped into a single work plan for that exchange.

Since the modification or inventory update actions which are grouped may originate from separate change requests (for example relating to different services or users), efficiency can be significantly improved as compared to a system where each change request is performed as an indivisible task and without regard to other change requests.

The analysing and/or performing steps may be performed in response to a predetermined condition, for example at a predetermined time, or in response to an operator command, or after a predetermined number of change requests have been received. For example, in this way the execution of configuration actions can be limited to a certain time period—for example during the night when there is less network traffic—so as to reduce the impact of the configuration changes on the network and its users.

Performing a network configuration action may comprise one or more of: adding a network resource to the network; removing a network resource from the network; transmitting a configuration command to a network resource; and adding, modifying or removing a connection to or from a network resource.

The invention also provides a method of performing network modification in a telecommunications network, comprising: storing a database comprising a master inventory defining network resources available in the network; and performing a network modification by a process comprising: modifying the database storing the master inventory; and modifying the network in dependence on the modified database.

In this way (and as previously set out), a system can be provided in which changes in the actual network are made in response to changes to the inventory (preferably always or at least in normal circumstances, possibly not including emergency repairs or modifications). An inventory can thus be provided which reflects the state of the actual network more accurately, and which can allow for more reliable planning decisions and changes to the network. The inventory can also enable service provisioning processes to be automated more effectively.

The master inventory may define network resources which exist in the network and are available for use, and may additionally define planned network resources which do not yet physically exist in the network or are not connected or configured for use.

Preferably, performing the network modification further comprises: outputting a change record describing the modification made to the database; and modifying the network using the change record. This can provide a reliable mechanism for controlling changes to the network.

The method may comprise collating a plurality of change records describing modifications to the database to generate a network modification plan, the network modification plan defining multiple network changes, and modifying the network using the modification plan. This can enable more efficient network modification by grouping multiple changes. The changes may be grouped based on a number of factors, including the type of equipment to which a change relates and/or the network location at which the change is to be performed. Using the latter criterion, network modifications can be grouped based on location, so that, for example, the modifications can be performed in a single visit to the location.

The network modification preferably comprises addition and/or deletion of one or more network resources to and/or from the network. The database preferably stores elements representing network resources; and modifying the database preferably comprises adding, deleting or modifying one or more database elements in the database.

The method may further comprise: storing a service inventory, the service inventory being derived from the master inventory and containing information used for the provisioning of services in the network; and provisioning services in the network using the service inventory. This can allow service provisioning (typically a more frequent activity) to be performed separately of network design and planning, which can lead to improved reliability. Preferably, the service inventory includes only such information as is required to perform service-provisioning and related tasks.

Provisioning a service preferably comprises: modifying the service inventory in dependence on the service being provisioned; and configuring the network to provide the service in dependence on the modified service inventory. This can ensure that the service inventory reflects provisioned services more accurately and can allow for more sophisticated provisioning processes. Provisioning the service preferably comprises generating configuration information in dependence on the service inventory modification, and transmitting the configuration information to one or more network resources in the network to configure the network resources to provide the service.

The method preferably comprises updating the service inventory in response to changes in the master inventory. In this way, the service inventory can be kept up-to-date.

In a further aspect of the invention, there is provided a method of managing a telecommunications network comprising: storing a database comprising a master inventory defining network resources available in the network; storing a database comprising a service inventory, the service inventory being derived from the master inventory and containing information used for the provisioning of services in the network; and modifying the service inventory in response to modification of the master inventory. This can allow network design/planning and service provisioning to be performed independently, whilst ensuring that both use an accurate data model.

The method preferably comprises modifying the network by a process including: modifying the master inventory; generating change information in response to modification of the master inventory; and modifying the network in dependence on the change information. The method preferably comprises provisioning a service in the network by a process including: modifying the service inventory; generating configuration information in response to the modification of the service inventory; and transmitting the configuration information to the network. The method may comprise receiving a service order relating to a service, and provisioning the service using the service inventory in response to the order. The master inventory and service inventory may alternatively be provided as a single network inventory. The inventory or inventories may be in the form of an inventory model, stored in accordance with a given data model in a database.

Preferably, the method comprises analysing utilisation of network resources in the network, and planning changes to the network in dependence on the outcome of the analysis. Analysing and planning preferably comprises: measuring the utilisation of one or more network resources in the network over time; analysing the measured utilisation over time of the one or more network resources to determine a utilisation trend; predicting future utilisation of the one or more network resources using the determined utilisation trend; and planning changes to the network in dependence on the predicted future utilisation.

This feature is also provided independently. Accordingly, in a further aspect of the invention, there is provided a method of generating planning data defining changes to a telecommunications network, comprising: measuring the utilisation of one or more network resources in the network over time; analysing the measured utilisation over time to determine a utilisation trend; calculating a predicted future utilisation of the one or more network resources using the determined utilisation trend; and generating planning data defining changes to the network in dependence on the predicted future utilisation of the one or more network resources. This can enable higher-quality planning data to be generated, which is derived using information on the actual network and the utilisation of actual network resources. A planning process can thus be provided which is driven by the actual (existing) network, rather than high-level, abstract service requirements. This can lead to the planning of network changes which can be more easily implemented in the existing network.

The one or more resources are preferably associated with a given network location; the planning data defining changes to the network at the network location. Alternatively or additionally, the one or more resources may be associated with connection resources between network locations; the planning data defining changes to the connection resources.

The term 'network location' preferably refers to a location or area where a specified portion of the network is located, for example a geographical area such as a town or city, or a location where network equipment and connections are provided, such as a building or building complex, or a floor or room in a building. For example, an exchange may be a network location. A network location may also be a logical grouping of network resources. A network typically includes a plurality of such network locations, interconnected in some way.

The method preferably comprises calculating a measure of the predicted demand for a type of network resource in dependence on the predicted utilisation; and generating the planning data in dependence on the predicted demand. The measure of the predicted demand for a type of resource is preferably calculated in dependence on the predicted utilisation of the one or more resources and in dependence on one or more adjustment parameters. This can provide greater flexibility.

The one or more adjustment parameters may comprise one or more of: a global adjustment factor, a local adjustment factor, and a service trend adjustment factor. The method preferably comprises analysing service data relating to services provided using the one or more network resources or the network location over time to determine a service trend; and determining the service trend adjustment factor in dependence on the service trend. In this way, higher-level service requirements can still be taken into account in a network driven planning process.

The global adjustment factor may relate to external conditions relevant to the network, for example general economic conditions. The local adjustment factor may relate to conditions local to a geographical area or population of an area and/or local to a portion of the network including the one or more network resources and/or the network location. The planning data may define one or more modifications, additions and/or removals of network resources in the network.

The invention also provides a method of performing network modification in a telecommunications network comprising generating planning data defining changes to the network using a method as described above, and performing network modification in dependence on the planning data. The network modification may be performed using a method as described above. The above methods (as well as those set out below) may be combined in any other suitable way.

In a further aspect of the invention, there is provided a method of managing a telecommunications network, comprising: maintaining a master inventory defining network resources available in the network; and implementing changes to the network by: implementing the changes in the master inventory; and translating the inventory changes into changes to the network.

In a further aspect of the invention, there is provided a method of managing a telecommunications network comprising: maintaining a master inventory describing network resources available in the network; maintaining a service inventory, the service inventory being derived from the master inventory and containing information used for the provisioning of services in the network; and updating the service inventory in response to changes in the master inventory.

In a further aspect of the invention, there is provided a method of planning changes to a telecommunications network, comprising: measuring the utilisation of one or more network resources in the network over time; analysing the measured utilisation over time to determine a utilisation trend; predicting future utilisation of the one or more network resources using the determined utilisation trend; and planning changes to the network in dependence on the predicted future utilisation of the one or more network resources.

In a further aspect of the invention, there is provided a method of generating planning data defining planned changes to a telecommunications network, comprising: representing the network in an abstract representation as a plurality of capability objects, each capability object representing a network capability; and generating planning data specifying changes to network capabilities, the changes being expressed in the planning data at a level of abstraction corresponding to that of the abstract representation.

This can enable more effective planning of network changes which does not rely on a detailed network model. Planning decisions can be expressed in more abstract terms, allowing their implementation to be determined separately by a resource planner.

Network capabilities may, for example, include groupings of network resources and/or network functions, technical or functional characteristics of parts of a network, and/or services and functions providable by a network or by part of a network. Network capabilities are preferably represented independently of the network resources which provide the capabilities.

The changes may be expressed in the planning data in terms of or in terms corresponding to the abstract representation. Thus, the changes are preferably expressed in terms of the capabilities represented (or representable) in the abstract representation. For example, the planning data may specify the addition, modification and/or removal of network capabilities. The terms "change" and "modification" (and related terms) are herein meant to encompass the addition of new capabilities or resources as well as the modification or deletion of existing capabilities or resources (or of representations thereof in a model or database), unless the context otherwise requires.

The abstract representation is preferably in the form of an abstract network model (also referred to herein as a planning model or capability plan), preferably stored in a database. The term "object" is used here in a general sense to refer to a representational unit or entity. Capability objects may be represented using database entities such as database tables (in a relational database) or database objects (in an object database), depending on the type of database used.

The method preferably comprises modifying the abstract representation in dependence on the planning data. This may involve adding, modifying or changing capability objects so as to reflect the planned changes. Preferably, the method comprises translating the planning data specifying changes to network capabilities at the abstract level into detailed planning data specifying network changes for implementing the capability changes. The detailed planning data may specify addition or removal of or changes to network resources (for example network equipment) in the network (or in a network model).

The method preferably further comprises storing a model of the network, the model defining network resources of the network; and modifying the network model in dependence on the planning data. The model is preferably more detailed than the abstract representation (i.e. at a lower level of abstraction), and preferably represents network resources of the network, for example network equipment and connections between equipment.

The method may further comprise storing a plurality of templates each defining changes to the network model, selecting a template in dependence on the planning data, and modifying the network model using the template. The use of templates can allow for more efficient and controlled implementation of planning requirements in the network model. A given template may be associated with one or more parameters, in which case values for the parameters are preferably derived from the planning data. Parameterisable templates can provide greater flexibility.

The method preferably comprises implementing the network changes in the network in dependence on the modifications made to the network model. This can ensure that correspondence is maintained between the network model and the actual installed network.

Capability objects may represent one or more of: partitions of network resources of the network, for example network domains, network areas, network locations, or equipment sites; physical characteristics of locations or sites; and technological capabilities or logical capabilities available at locations or sites or connecting locations or sites. Technological and logical capabilities may also be viewed as representing partitions of network resources (i.e. technological/logical rather than geographic partitions).

Preferably, the abstract representation comprises a hierarchy of capability objects representing a hierarchical partitioning of network resources of the network (for example, a network location comprising one or more equipment sites each comprising one or more technological capabilities). This can simplify planning and enable more efficient implementation of planned changes. The abstract representation preferably does not directly represent low-level network resources such as pieces of network equipment or specific connections. More generally, the abstract representation preferably comprises only such information as is needed for performing planning tasks (i.e. data is held only at a level of detail needed to support network planning).

The invention also provides a planning system for generating planning data defining planned changes to a telecommunications network, comprising: a database storing a planning model representing the network using a plurality of capability objects, each capability object representing a network capability; and a planning module adapted to generate planning data specifying changes to network capabilities in dependence on the planning model.

Also provided are a network management system or network planning system adapted to perform a method as described herein, apparatus comprising means for performing a method as described herein and a computer program or computer program product comprising software code adapted, when executed on a data processing apparatus, to perform a method as described herein.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:

FIG. 1 shows in overview a network management system for managing a telecommunications network 26.

Figure 1:
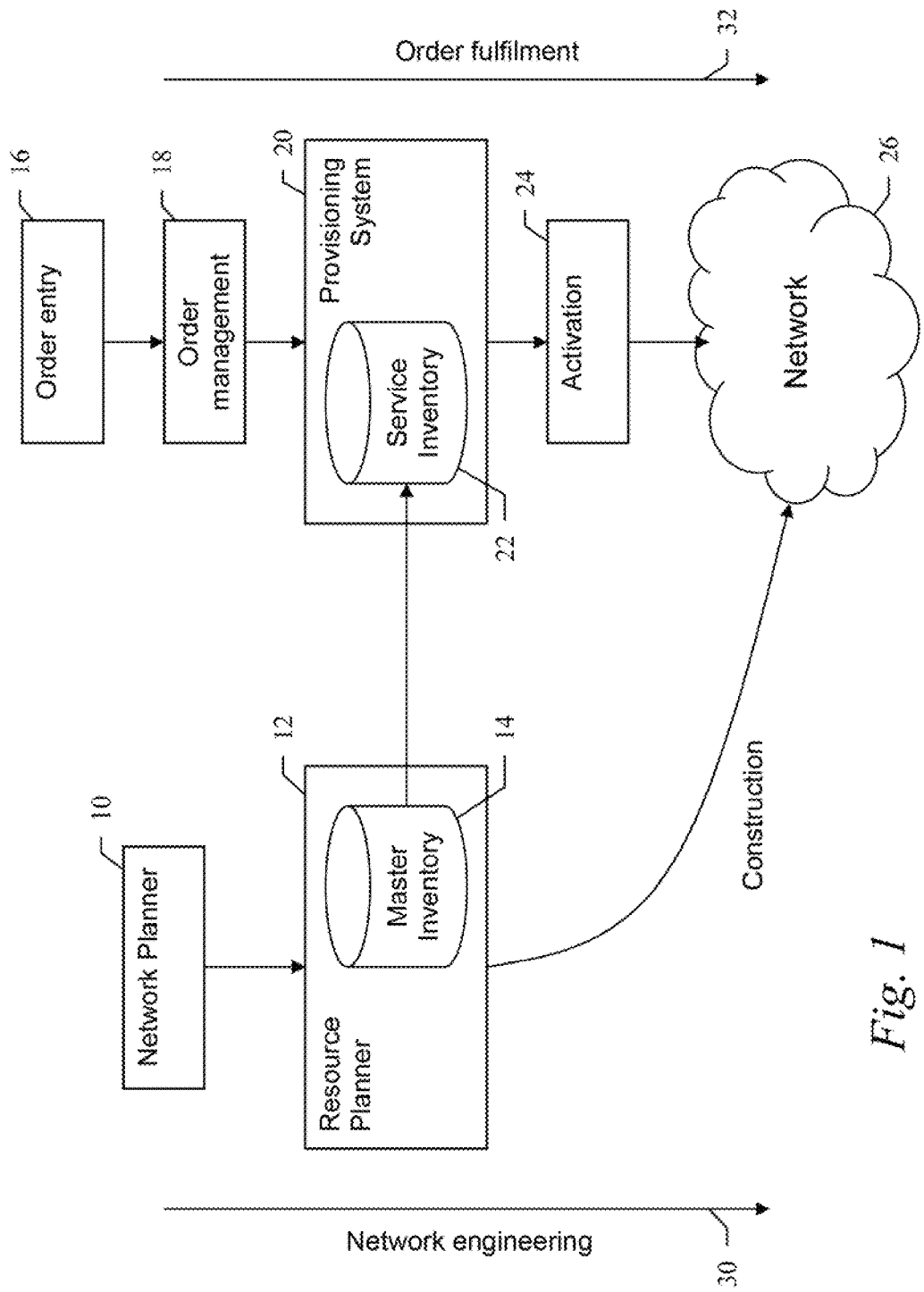
FIG. 1 illustrates a network management system in overview, including network engineering and order fulfilment processes.

The network management system is an operational support system for supporting the operations of a telecommunications service provider. It provides facilities for carrying out two distinct management processes: a network engineering process and a service order fulfilment process. The network engineering process includes the planning, design, and physical construction of the network. The order fulfilment process includes the provisioning of services to users of the network in response to service orders.

Underlying these processes is a master inventory 14. The master inventory 14 provides a representation or model of the network which supports the various processes outlined above. Specifically, the inventory stores information defining the network resources available in network 26, including network devices, connections between network devices, and features and characteristics of devices and connections. The inventory may also store information defining planned resources, i.e. resources which do not yet physically exist in the network or are not connected or configured for use, but which are intended to be added to the network. In preferred embodiments, the master inventory (also referred to as the resource inventory) stores sufficient detail, but no more detail than required, to carry out its two primary tasks: firstly to allow the specification of changes to the network that will be implemented by physical planning and construction processes (either internally, by device vendors, or by other suppliers); secondly, to populate the service inventory 22 (described below) with network data, so that the service inventory is able to build service specific inventory data on top of the network data and so enable service provisioning in the inventory.

The inventory is managed by a resource planner 12. Resource planner 12 controls changes to the inventory, for example the addition or removal of network resources.

A network planning application 10 interacts with the resource planner 12 and provides functions for supporting the planning of the network, principally by analysing information held in the inventory and identifying changes to the network needed to enable the network to meet future demand. The network planning module 10 interacts with the resource planner 12 to implement the changes.

Any changes made to the master inventory 14 are translated into changes to the actual network 26. These changes may include physical changes, such as the installation of new equipment or connections, as well as the configuration of equipment or connections. The planning and construction functions together form the network engineering process represented by arrow 30 in FIG. 1.

The order fulfilment process is represented by arrow 32.

To support the order fulfilment process, an order entry module 16, an order management module 18, a provisioning subsystem 20 and an activation module 24 are provided.

Service orders are received by the order entry module 16, which may, for example comprise an interactive order entry application. Service orders are then processed by order management module 18, which identifies the specific services that need to be provisioned in response to a given order, and carries out other associated functions (such as billing), in some cases by interaction with external systems. Once the relevant services have been identified, the order management system instructs the provisioning system 20 to provision those services in the network.

The service provisioning system 20 is responsible for provisioning services to users of the network 26. The provisioning system 20 maintains a service inventory 22 used for provisioning services in the network. The service inventory 22 is derived from the master inventory 14, but typically contains only the information from the master inventory 14 that is needed to enable the provisioning of services and the management of provisioned services. The service inventory 22 typically also contains additional information not present in the master inventory to support the provisioning processes.

To provision a service, the provisioning system 20 identifies network resources in the service inventory 22 which can be used to provide the service, generates network configuration information for configuring the identified network resources to provide the service, and updates the service inventory 22 to reflect the new service. The configuration information is passed to activation module 24 which generates device-specific configuration instructions and transmits these to the network to set up the new service.

Figure 2:
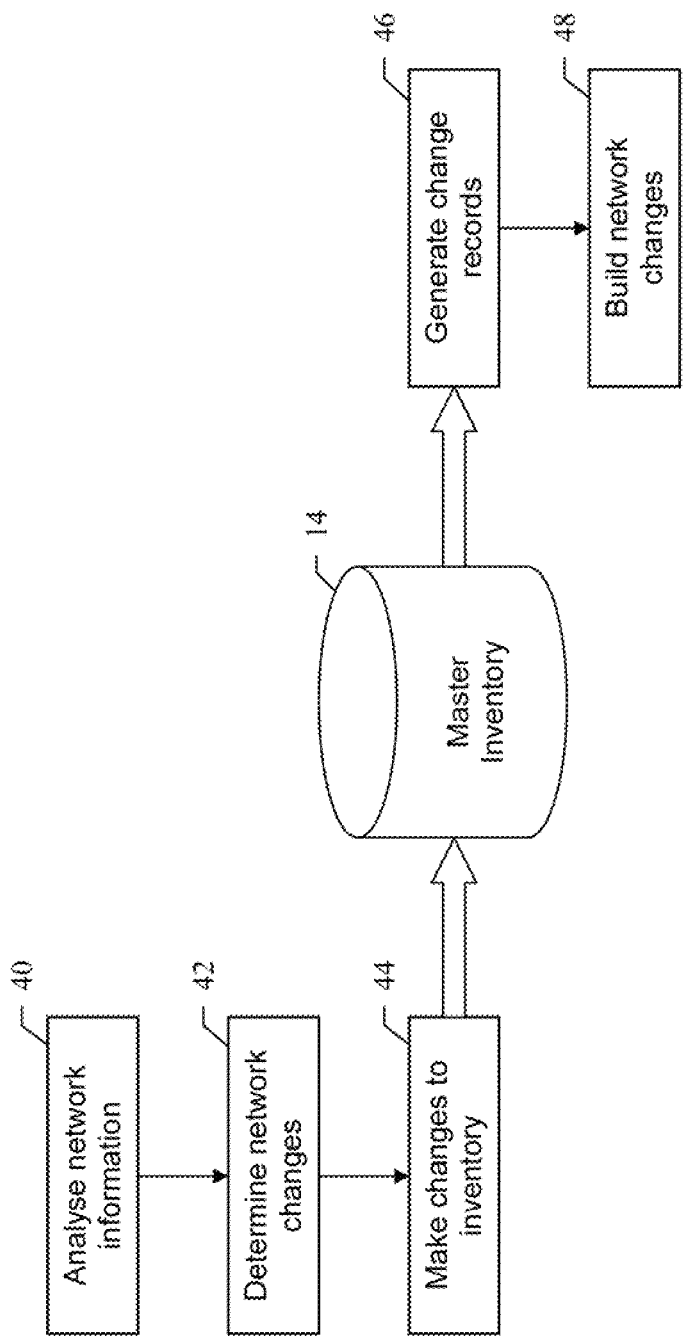
FIG. 2 illustrates the network engineering process in greater detail.

The network engineering process 30 is illustrated in more detail in FIG. 2.

Information about the network is obtained and analysed in step 40. This information typically includes information obtained from the master inventory 14, but may also include other information, such as service data and external data. In some embodiments the information is provided by a separate, abstract, planning model (described in more detail below). The analysis results in the identification of requirements for the network.

In step 42, changes to the network are determined to support the identified requirements. These changes are implemented in the inventory 14 in step 44.

In response to changes in the inventory 14, change records are generated in step 46. These change records define the changes which need to be made to the network to ensure that the network corresponds to the network model of the inventory 14. The change records are used to implement the changes in the network in step 48.

The changes typically include the addition of new network resources (e.g. network devices or physical connections between devices) to the network 26 as well as (less frequently) the removal of existing network resources from the network 26. This process of maintaining and changing the physical network is referred to herein as network construction.

In normal circumstances, the physical network is thus modified only in response to modification of the inventory 14. In this way, it can be ensured that the master inventory 14 maintains an accurate model of the network and can thus serve to reliably support other operational processes. The inventory 14 is, in effect, master of the network in the present system, unlike many prior art systems where a network model is generated from the physical network, for example by information extraction/discovery. In the present system, the inventory 14 controls the physical shape and configuration of the network, not vice versa.

The master inventory stores the information required to support any operational processes, in particular those under the control of the network management system, but also external processes not discussed here, such as reporting functions.

Changes may also be made to the inventory 14 without the network planning process of steps 40 and 42 (which may be supported by the network planning application 10 of FIG. 1). To enable such changes, the resource planner 12 typically includes an interactive application by way of which a network designer can add, modify or delete network resources in the inventory directly, for example to increase capacity or introduce new technologies.

Figure 3:
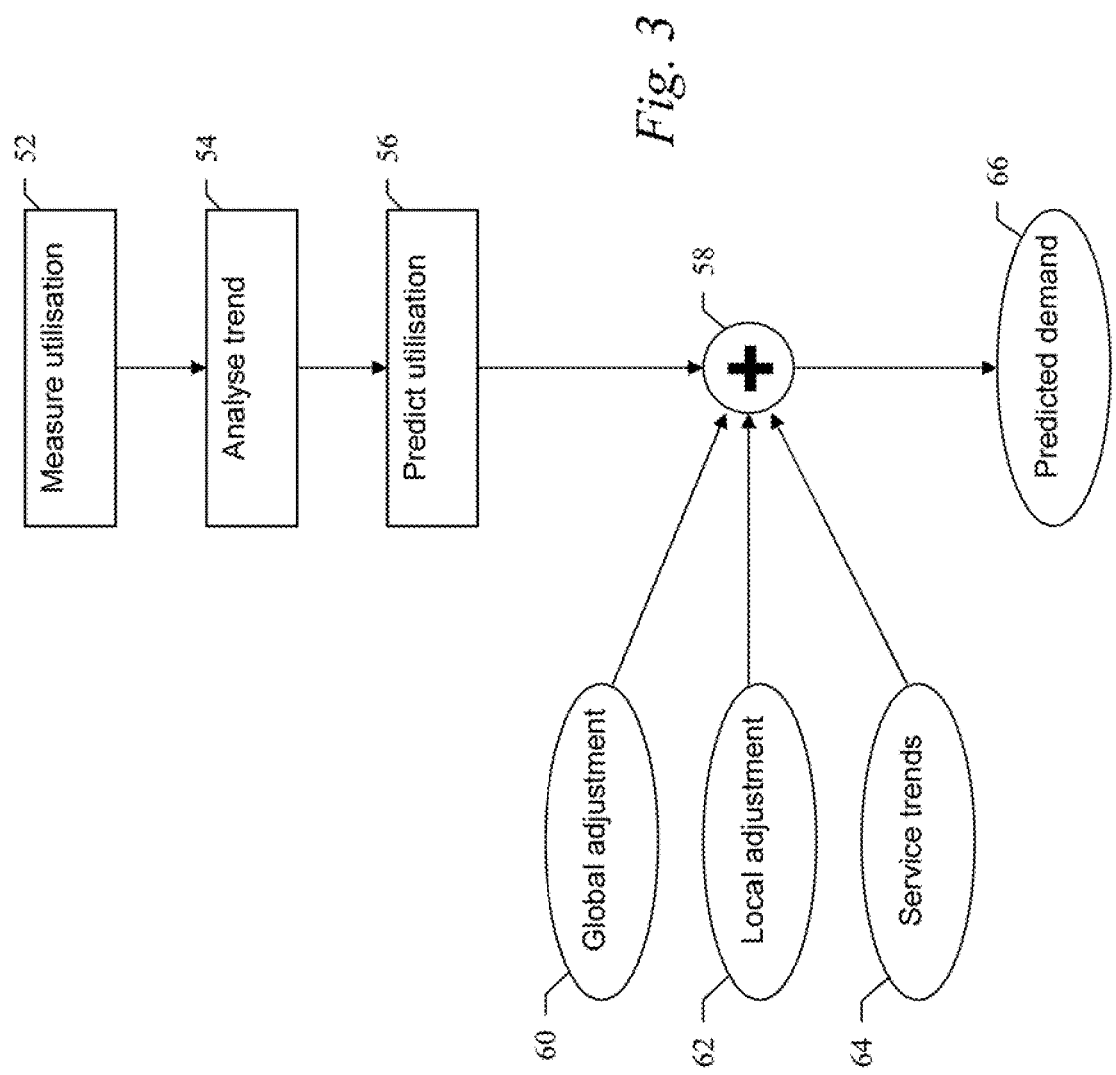
FIG. 3 illustrates a network planning method.

A variety of planning methods may be used in the network planning process summarised above in steps 40 and 42 of FIG. 2. One example of a planning method is illustrated in more detail in FIG. 3.

This planning method uses utilisation information relating to specific resources to determine future demands and determine network upgrades needed to support those demands.

The utilisation of a resource or group of resources is measured in step 52. This information is obtained from the service inventory and measured over time. In some embodiments, utilisation data may also be directly obtained from the network.

The utilisation data typically specifies the assignment of resources to services (e.g. the assignment of ports or timeslots). For example, the utilisation data may specify that, at a given network location, n out of m available access ports are assigned to services, and that m-n access ports are hence available for provisioning of future services. In some embodiments, as an alternative or in addition to the above view of resource utilisation based on service assignment, utilisation data relating to data flow through given network resources may also be used (such data would typically be obtained from the network).

The utilisation data is analysed in step 54, and a utilisation trend is determined. The utilisation trend specifies whether utilisation of the resource or resources is increasing or decreasing and the rate of that increase/decrease, or whether utilisation is essentially static. The utilisation over a given future period is then predicted at step 56 based on the identified utilisation trend. Known curve-fitting/extrapolation techniques may be used to identify trends and calculate predicted utilisation.

The predicted utilisation of the resource or resources may be used to determine a predicted demand 66 for a given type of resource. Typically, the type of resource directly corresponds to the resource or resources under consideration. Alternatively, the resource or resources under consideration may be of a different type, but the information on their utilisation may nevertheless be useful in (indirectly) predicting demand for a certain type of resource.

This predicted demand 66 can be directly derived from the predicted utilisation calculated in step 56. Alternatively, the predicted demand may be arrived at by combining the predicted utilisation with one or more adjustment parameters in step 58. By way of example, three types of adjustment parameter are described here: a global adjustment parameter 60, a local adjustment parameter 62, and a service trend adjustment parameter 64.

A global adjustment parameter 60 may be used to reflect conditions relevant to future demand which are generally applicable to the network as a whole, for example prevailing economic conditions or economic predictions, marketing campaigns or sales initiatives, or changes in service pricing. As a specific example, economic conditions may suggest that a period of increased growth is expected, and the global adjustment parameter may then specify that the predicted demand should accordingly be increased by a specified percentage.

A local adjustment parameter 62 may be used to reflect conditions which may affect a portion of the network, for example a specific network location, such as a network exchange. For example, knowledge of a major residential building programme in a given area may indicate a likelihood of greater-than-average growth in resource utilisation at a certain exchange, and a local adjustment parameter may therefore specify that the predicted demand for that exchange should be increased by a specified percentage. Alternatively, a local adjustment parameter may relate to conditions local to a given geographical area or population of an area (typically an area associated with the network resources under consideration).

A service trend adjustment parameter 64 may be used to reflect trends in the use of certain services (typically services relevant to the network resources under consideration or a network location including those resources). The service trend adjustment parameter may be determined by analysing service information held in the service inventory to determine service trends. For example, a given network location may be associated with a greater-than-average increase in the uptake of broadband internet services. A service trend adjustment parameter may reflect this service trend by specifying that the predicted demand for a given type of network resources should be increased by a specified percentage. The service trend adjustment parameter may itself be varied in dependence on the magnitude of the service trend. Instead of services provided at a specific location, end-to-end service trends may also be analysed (e.g. by analysing services provided between given locations). Such service trends may affect future demand at the relevant locations or at some other location (e.g. an intermediate location which may be involved in the provision of the services), and may thus be used as the basis for service trend adjustment parameters.

The above adjustment parameters may be used in any suitable combination, and multiple adjustment parameters of any given type may be used. Typically, a local adjustment parameter will relate to a specific location or portion of the network, and will accordingly only be used in the calculation of resource demand for that location.

The adjustment parameters may be stored by the network planning application, or in the inventory 14 itself, and may be set by a network planner or obtained automatically from a suitable source. Service trends may be calculated off-line and stored (typically associated with network locations), or may be calculated on-the-fly during planning.

Once the predicted demand for a type of network resource at the given location (or, in the case of connection resources, between locations) has been determined, the network planning application 10 derives planning requirements by comparing the predicted demand for resources to the resources which are actually in place in the network and which are available for providing services (this information is available in the master inventory model 14 and/or the service inventory 22). The difference between the resource demand and the existing resources determines what resources need to be added to the network in order to meet the predicted future demand. These requirements are then used to instruct the resource planner 12 to create new resources of the relevant type in the network (e.g. at the specified location). The network planning application 10 may also instruct the resource planner to create additional resources needed to support the resources being added. For example, the addition of a certain type of device to the network may require other supporting devices to be added, and connections between devices may also need to be created. In some cases, certain network functionality required for operation of the new resources may be implemented by way of internal services (i.e. services which are not directly associated with end users), in which case the resource planner 12 interacts with the provisioning system 20 to initiate provisioning of those internal services.

Resource planner 12, which is preferably an automated process (but may include a human planner), receives the information specifying the new resources from network planning module 10 and creates the new resources in the master inventory 14.

As discussed above, in response to the changes in the inventory, change records are generated documenting the changes. These change records are then used to physically implement the changes in the network, e.g. by adding network devices and/or connections at the relevant location.

The system preferably collates multiple related change records to produce a network modification plan. Such plans typically represent groups of network changes, grouped for organisational purposes. Network construction activities are then driven by network modification plans. Changes may be grouped into plans based on appropriate criteria, such as the equipment type involved, the class of engineering personnel required to carry out the changes, and/or the network location at which the physical changes are to be implemented. Changes relating to specific network resources (for example configuration changes) may also be grouped. Grouping network modifications in this way can improve the efficiency of the network construction and configuration processes, and reduce disruption caused by the changes. The processing of network changes is discussed in more detail below.

In a preferred embodiment, the network planner 10 outputs planning data describing planned changes at a more abstract or less detailed level than is needed for implementation of the changes in the network. The resource planner 12 then determines the detailed, low-level implementation of the changes.

More specifically, in this embodiment the network planner maintains a higher-level, more abstract representation of the network, referred to as the planning model or capability plan. The capability plan models the network in terms of network capabilities (typically associated with network locations or connections between network locations), without representing the detailed network structure that provides those capabilities. In preferred embodiments, the capability plan preferably holds only such information as is needed for the planning functions.

The network planner 10 analyses resource utilisation to determine future resource demands, and identifies network capabilities needed to meet those demands based on the existing capabilities modelled in the capability plan. It then outputs a planning request specifying the capabilities needed to the resource planner 12. The resource planner 12 then determines the changes to or additions of network structure and resources needed to provide the new capabilities, and implements the changes in the master inventory 14. The changes to the master inventory 14 are then translated into physical network changes as has been described above.

One preferred method of converting the high-level planning requirements output by the network planning module 10 into specific changes in the master inventory 14 uses templates, referred to herein as Standard Builds. A template or Standard Build represents a set of specific configurations, preferably expressed in the same way as data items in the master inventory and used to specify controlled changes to the master inventory.

Standard Build templates specify standard types of growth, shrinkage or change of network facilities (typically those change types which occur reasonably frequently in day-today operations). They can also act to constrain the planning module 10 (and/or human planners) to a given set of possible change types, which can lead to a more controlled and structured network.

Thus, a Standard Build template may specify the addition, modification or removal of resources in the master inventory. The system preferably stores a library of Standard Build templates, each associated with given planning requirements. The resource planner 12 selects a Standard Build template associated with a given planning requirement, and instantiates the template with any required parameters (for example specifying a relevant network location), to produce detailed implementation information for implementing the requirement in the master inventory.

Standard Build templates may, for example, correspond to types of capability object used in the capability plan. The addition of a given capability object to the capability plan by the planning module 10 can then be implemented by the resource planner 12 in the master inventory by using the appropriate Standard Build template corresponding to the capability object added.

As an example, a Standard Build template called 'Mid-Size SDH Customer Access' could specify an SDH Add Drop Multiplexer, at a specified location, with two connections of STM-4 bandwidth from its East and West ports to separate, unspecified core SDH Cross Connects that exist at the specified location, and presenting 400 tributary ports at 2 Mbit/s bandwidth. Such a Standard Build would be invoked if the planning module 10 determined a requirement for, say, 325 additional SDH customer access ports at a location.

To enable the resource utilisation and service trends to be determined, the service inventory preferably records information allowing changes to the network over time to be analysed. This can be achieved through data warehousing techniques such as maintaining time-stamped records corresponding to previous states of the network alongside the current network state.

In some embodiments, the master inventory 14 may store some service-related data for the purposes of determining utilisation trends. This data is received from the service inventory 22 when new services are provisioned by provisioning system 20 or by way of a periodic update procedure. In this way, the network planning module 10 can determine utilisation trends without needing to access both the master inventory 14 and the service inventory 22, which can lead to improved efficiency. In some further embodiments, the master inventory and service inventory may be provided as a single inventory accessed separately by resource planner 12 and provisioning system 20, thus removing the need for updating one inventory in response to changes in the other.

The above description is intended to illustrate in a simplified form the basic components, processes and concepts of the network management system, an embodiment of which will now be described in more detail with reference to FIGS. 4 to 6.

Figure 4:
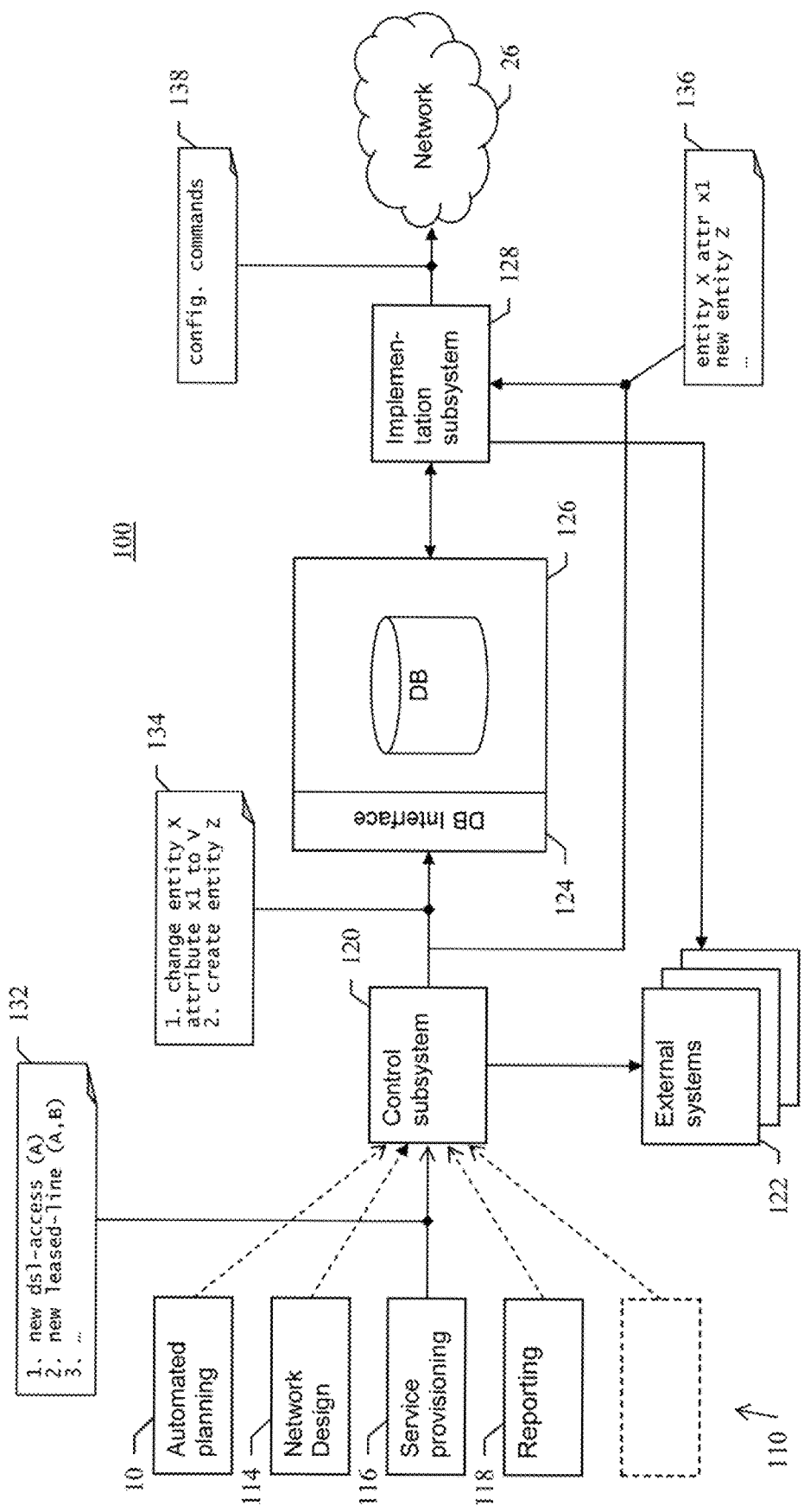
FIG. 4 illustrates the processing of network change requests by the network management system in overview.

FIG. 4 illustrates the architecture of an embodiment of the network management system and shows the main steps involved in implementing a required network change in the physical network. In this embodiment, the master inventory 14 and service inventory 22 described above are provided in the form of a single, combined inventory model 126, provided in the form of a database. Thus, the inventory model 126 includes model entities representing network resource and topology data as well as service data. Of course, in practice, network, service and other relevant data may be stored in a single model database or may be divided across multiple models or databases in any appropriate manner, depending on the requirements of the specific implementation.

The network management system 100 of this embodiment comprises a control subsystem 120 for managing the execution of network modification tasks, the inventory model 126, and an implementation subsystem 128 for implementing changes made in the inventory model 126 in the physical network 26.

The control subsystem 120 receives network change requests from a number of network management applications 110. Network management applications 110 obtain information on the network from inventory model 126 and use that information to perform various activities involving changes to the network and/or other related systems. Examples of network management applications include an automated planning application 10 (as already discussed above), a network design/resource management application 114, a service provisioning application 116 (corresponding, for example, to order entry, order management and provisioning components of FIG. 1) and a reporting application 118.

The automated planning application 10 may provide a variety of network planning mechanisms, such as forecasting service demands, identifying resource requirements and planning network upgrades, as already described above. Network design/resource management application 114 allows the network operator to view and modify the configuration of the network and manually control the removal, addition, connection and configuration of network resources, for example to augment automatic planning activities carried out by planning application 10. Service provisioning application 116 provides functionality for the provisioning of services to users of the telecommunications network 26, including, for example, identifying network resources usable for a given service, requesting new resources where needed, designing circuits and reserving bandwidth for services.

The above application functions may involve a variety of changes to the telecommunications network 26, for example:

Removing or adding network equipment
Connecting equipment or changing existing connections
Configuring devices
Setting up circuits and reserving bandwidth in the network Some activities of the network management applications 110 may alternatively or additionally require action by external systems, such as a billing system (for example setting up a new user's billing account on a separate billing system) or stock management system (for example requesting new equipment). The external actions may also include manual activities. These external activities may be initiated either by the control subsystem 120, if the activity is best managed as part of the specific change request, or by the implementation subsystem 128 if the activity can be grouped with other similar activities as is described in more detail below.

The control subsystem 120 receives network change requests from network management applications 110 and passes details of any external actions to relevant external systems 122, which may include reporting systems for reporting tasks requiring external and/or manual execution to an operator.

Changes to the network 26 itself are made in two stages. Firstly, the control subsystem 120 initiates changes in the inventory model 126. This typically involves translating the high-level changes specified in the change requests into a set of more detailed inventory updates. Secondly, the implementation subsystem 128 configures the network 26 in response to the changes made to the inventory model.

In the example illustrated, control subsystem 120 receives a change request 132 from service provisioning application 116. The change request may specify several high level tasks which are to be carried out. The control subsystem 120 then generates a set of inventory update instructions 134 corresponding to the tasks. The inventory update instructions 134 are passed to a database interface 124 which carries out the instructions and updates the inventory model 126 accordingly.

Additionally, the control subsystem 120 generates one or more change records 136, which record the changes made to the inventory.

The change records 136 output by the control subsystem 120 are passed to the implementation subsystem 128. Implementation subsystem 128 uses the change records to access the inventory model 126 and identify the modifications made to the inventory model. Implementation subsystem 128 then generates corresponding configuration commands 138 to configure resources in the network 26 in accordance with the changes made to the inventory model (and may also call external systems or initiate manual activities in order to realise the changes beyond the inventory model).

Figure 5:
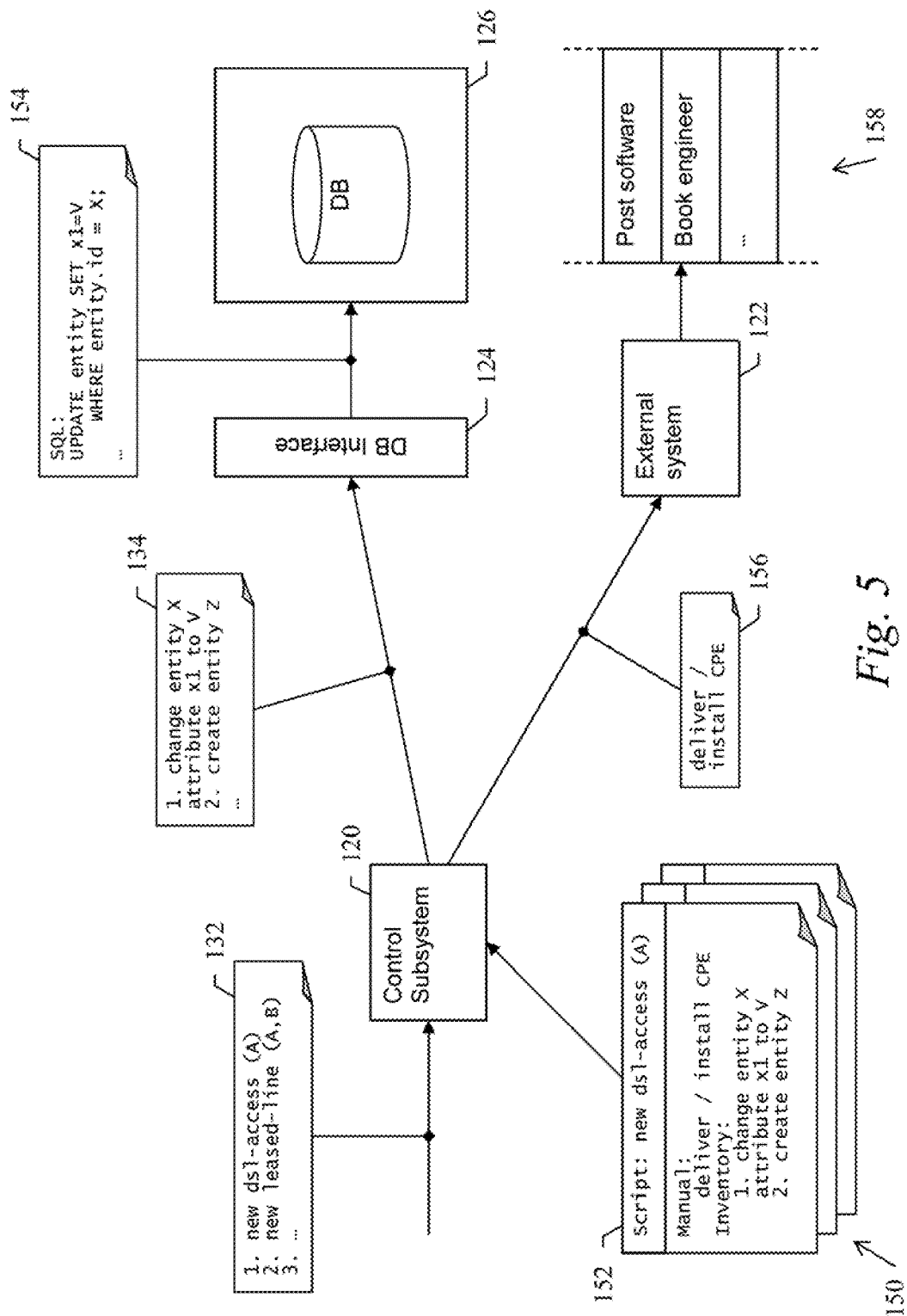
FIG. 5 illustrates the processing of network change requests by a control subsystem.

The operation of control subsystem 120 is illustrated in greater detail in FIG. 5.

As mentioned above, the control subsystem 120 receives a change request 132 specifying network changes. The network changes are specified at a high level, by specifying one or more predefined operations. The operations are defined by a set of scripts stored in a script library 150.

In the present example, the change request 132 includes a first item "new dsl-access", for requesting the setup of a new DSL (Digital Subscriber Line) Internet access service for a user. Control subsystem 120 accesses the script library 150 and retrieves the corresponding script 152 for implementing the new service. The script sets out the more detailed operations which should be carried out to provision the service.

A script may specify external tasks and inventory changes, as described above. Specific examples of external activities relevant to the current example may include, for example, the delivery and installation of customer premises equipment (CPE), such as an ADSL modem, the posting out of welcome letters or software, the booking of an engineer's visit using a workforce scheduling system, the placing of external supply orders, and the like. The external tasks (in the example task 156) are passed to a relevant external system 122, which performs or schedules the relevant activities 158 needed to complete the task.

To carry out the inventory changes, the control subsystem also transmits inventory update instructions 134 to the database interface 124. The interface 124 then generates and carries out the necessary database operations to update the inventory model 126.

The inventory model 126 is represented in the database by a data model. The data model includes data entities representing network resources and having attributes representing the configuration and other characteristics (for example life-cycle status and utilisation levels) of the network resources. Relationships between network resources, such as interconnections, are also modelled. In a given deployment of the described system, the network resources, the services on the network and other related items including customers, settings, capacity and locations are modelled with sufficient detail to achieve the purpose of the applications 110. Network resources may include physical installations, groupings of equipment and individual pieces of equipment (for example, data centres, exchanges, routers, switches, cards, physical ports, ducts, cables, and other devices or components), as well as logical entities (such as logical bandwidth divisions, logical ports and circuit routes). Interconnections may be specified at the physical or logical level (for example, connections between routers, physical ports or logical ports). The model may represent a complex network including a variety of different networking technologies.

However, the model need not necessarily provide a complete structural representation of the underlying network structure but may instead be designed to more effectively support network management functions of the network management applications 110. Thus the model may in essence be a functional rather than a structural model, or may be a combination of both. Examples of abstract or functional model entities may include an entity representing a circuit route between two given locations which, in fact, only exists as a sequence of interconnected network nodes across which traffic may be routed. Examples of concrete, structural model entities may include routers and switches.

The inventory model 126 may be implemented using any suitable data structures, depending on the type of database technology used (for example as a set of relational tables in a relational database, or as a collection of objects in an object database).

The inventory update instructions 134 generated by control subsystem 120 are preferably expressed in terms of the inventory model, rather than the data implementation. Database interface 124 generates corresponding database instructions 154 which are passed to the database's database management system (DBMS) for execution. For example, in a typical relational database, the database commands 154 may be in the form of SQL statements or calls to stored procedures.

As mentioned above and shown in FIG. 4, the control subsystem 120 additionally generates change records 136. These are used by implementation subsystem 128 to implement the required changes in the physical network 26, as shown in more detail in FIG. 6.

The implementation subsystem 128 typically processes change records in a batch process. The grouping of change records may be determined in a variety of ways; for example, the implementation subsystem 128 may be triggered at certain predefined times, after a certain number of changes or change records have been generated, or in response to an operator command. Once invoked, the implementation subsystem processes the change records accumulated since the implementation subsystem was last run.

Figure 6:
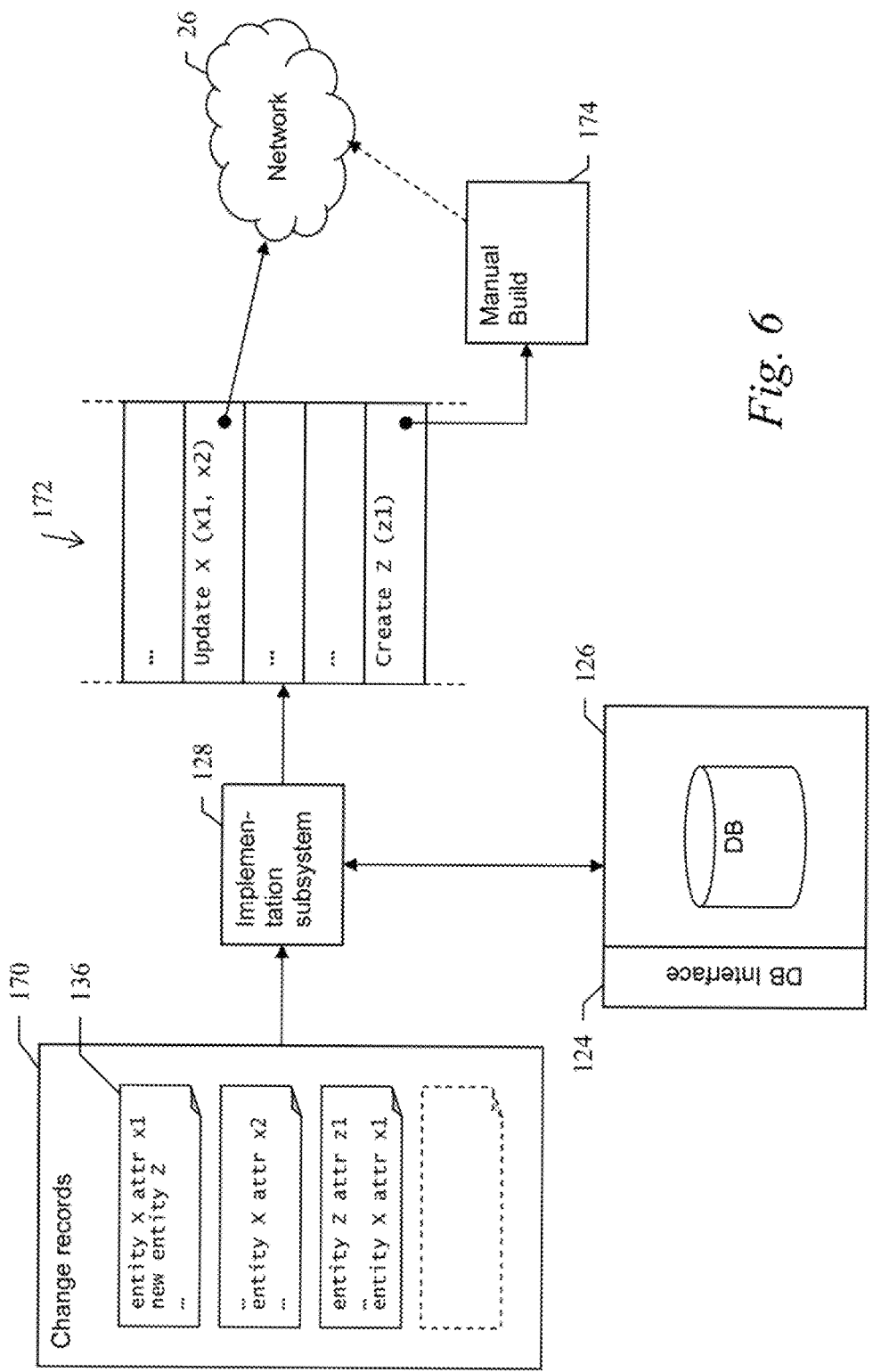
FIG. 6 illustrates the implementation of change requests in a telecommunications network.

FIG. 6 shows a set of change records 170 being processed, including the change record 136 of the example of FIG. 4, along with other change records generated by subsequent change requests. By processing change records in batches, efficiency and reliability can be improved. In particular, it may often be preferable not to allow network updates to be carried out at arbitrary times. Instead, it may be preferable to perform network updates at times of reduced network traffic (for example during the night), so as to reduce disruption to the physical network 26 and to services and users.

The implementation subsystem 128 preferably groups network changes intelligently so as to minimise the number of configuration operations carried out in the physical network 26.

For example, implementation subsystem 128 may group changes relating to the same device into a single configuration action. The implementation subsystem then only needs to access the device in the network once to carry out all the required changes for that device.

In the abstract example shown in FIG. 6, implementation subsystem 128 is processing a batch 170 of change records, including change record 136 of the earlier example. This change record includes the modification of attribute X1 of an entity X, and the creation of a new entity Z. Subsequent change records processed in the same batch include modification of a further attribute X2 of entity X, and a second modification to attribute X1 of entity X. Furthermore, an attribute Z1 of the newly created entity Z is also modified.

In this example, attribute X1 of entity X is therefore changed twice. For the present example, it is assumed that entity X represents a network device in network 26, and attribute X1 corresponds to a configuration parameter of the device. It may then be the case that there is no need to carry out separate configuration operations for each of the two changes of the parameter. Instead, it will typically be sufficient to perform a single configuration operation which updates the parameter to the most recent applicable value. The most recent value is obtained from the inventory 126. Specifically, the inventory model stores the end state of the model as a result of all the changes that have been made to it. The change records record each individual change made to the inventory model, so where a sequence of changes are made to an individual modelled entity, the model records the net change, whereas the change records record each individual change.

In the present example, it may further be possible to perform the changes to attributes X1 and X2 of entity X in a single device configuration operation. Similarly, it may also be possible to carry out the creation of new entity Z and its subsequent modification in a single configuration step.

Using the above approach, the implementation subsystem generates a set of configuration actions 172 for efficiently implementing the inventory changes. In the example, two actions are generated: an "update" action updating attributes X1 and X2 of entity X (using the currently valid attribute values as obtained from the inventory model); and a "create" action creating a new entity Z with attribute Z1 also set to the currently applicable value.

In one embodiment, the change records need not specify all the details of the changes made to the inventory, such as the actual values to which attributes are changed. Instead, they may merely specify the entities and attributes that have been modified. Implementation subsystem 128 then accesses the modified entities in inventory 126, and retrieves the required data from there. Even if the change records do contain more detailed information of the changes (for example for verification and auditing purposes), they are preferably used by the implementation subsystem only to identify the relevant changes in the inventory. As much information as possible is preferably obtained from the inventory directly.

For example, where a model entity represents a network device, and a change record relates to modifications to configuration parameters of that device, the implementation subsystem uses the change record as an indication that the configuration has changed, but not how it has changed. Instead, it retrieves the latest configuration of the device from inventory 126, and uses that information to update the configuration of the device accordingly.

By obtaining the configuration data directly from inventory model 126, the system can ensure that the configuration state of the network 26 corresponds exactly (or at least more closely) to the inventory model 126. As a result, the inventory model 126 controls the configuration state of the network 26, rather than being a passive record of the network. This approach can avoid discrepancies arising between the inventory model 126 and the network 26.

In some embodiments, change records may include more information than is used by implementation subsystem 128. For example, the change records may provide full details of the changes made to the inventory model. In addition to their use by implementation subsystem 128, fully detailed change records have a separate value in that they provide an audit trail for changes to the inventory model.

Configuration changes are implemented in the network 26 by the implementation subsystem 128 by generating configuration instructions for the specific devices in question (corresponding to the abstract configuration actions 172 shown in FIG. 6), in whatever command format is appropriate to the devices. These configuration instructions are then transmitted over the network to the devices. Devices may send acknowledgements that configuration instructions have been received and carried out, or may transmit failure messages where requested changes could not be completed, allowing the implementation subsystem to identify where problems may arise which could lead to discrepancies between the inventory model and the network. The implementation subsystem may then record these identified problems in the inventory model and/or bring them to an operator's attention. In addition, other activities, such as changes to other systems or manual activities, can be initiated by the implementation subsystem (e.g. by interaction with external systems 122 as mentioned above) using the same approach, to thereby take further advantage of the efficiencies provided by the intelligent grouping performed by the implementation subsystem.

Thus, where inventory changes require physical changes to the network, such as installing new equipment or manually wiring connections, the implementation subsystem may interface with a manual build subsystem 174 to request those changes. The manual build subsystem 174 schedules the necessary activities (e.g. ordering equipment and booking an engineer) and receives confirmation on completion, which is passed back to implementation subsystem 128. Implementation subsystem 128 awaits confirmation of completion of the installation before proceeding with any further modifications which depend on the newly added network resource.

Network Planning—Detailed Example

An example implementation of the network planning application 10 will now be described in more detail with reference to FIGS. 7 to 13. In this embodiment, the planning application is referred to as the Planning Engine.

Overview

One purpose of the Planning Engine as described in this example is to drive network evolution in accordance with operational strategy. The following describes the solution architecture of this capability.

Many carriers have begun the process of migrating their traditional networks into so-called next-generation networks. Due to the major investment required to achieve such a fundamental shift in the network, it is desirable for key strategic decisions to be captured and applied in a planning process that is informed by both future demand and existing infrastructure.

It is believed that such a planning function can be best achieved as an extension to a universal inventory. This can provide a credible platform for addressing the long-term challenge of both planning rollout and ongoing strategic operation of the network. The aim is to construct an automated planning process coupling a Planning Engine with the more detailed resource planning beneath.

The Planning Engine can provide improvements in the management of network evolution, in particular with regard to the changes taking place for rollout and operation of next-generation networks. The approach described aims to achieve this through integration with the inventory, enablement of a repeatable process rather than once-only designs, the modelling of service with respect to capability as well as capacity, and an understanding of the full cross-domain problem space.

The Planning Engine forms the uppermost module in the network engineering stack, and follows the principles of a business driven network, where decisions are made in each system on data that are only as detailed as is necessary. The Planning Engine module is the master of high-level network change, and passes planning requests to the resource planning inventory for detail design and realization. The Planning Engine is enabled by the underlying network inventory data for initial abstraction load and ongoing utilization data. Tools are provided to visualize and manage the data, and to undertake high-value network analysis functions.

The following abbreviations are used in the description of the Planning Engine.

| Abbreviation | Description |
| --- | --- |
| API | Application Programming Interface |
| ATM | Asynchronous Transfer Mode |
| CoS | Class of Service |
| COTS | Commercial off-the-shelf |
| DSLAM | Digital Subscriber Line Access Multiplexer |
| EJB | Enterprise Java Bean |
| ERP | Enterprise Resource Planning |
| FR | Frame Relay |
| GEthernet | Gigabit Ethernet |
| IP | Internet Protocol |
| MPLS | Multi-Protocol Label Switching |
| MTNM | Multi-technology Network Management |
| MTOSI | MTNM Operating System Interface |
| NMS | Network Management System |
| PWE | Pseudo-Wire Encapsulation |
| QoS | Quality of Service |
| SDH | Synchronous Digital Hierarchy |
| SONET | Synchronous Optical Networks |
| VoIP | Voice over Internet Protocol |
| VPLS | Virtual Private LAN Service |
| VPN | Virtual Private Network |
| XML | Extensible Mark-up Language |

Network Evolution Planning

Traditionally, network planning assumed stable relationships between network domains and their associated technologies. Network planning was conducted in a domain-bydomain fashion, each such domain normally a technology-specific exercise. New networking technologies were introduced as an overlay to a current technology domain.

The current network planning processes, however, typically need to cover a host of new networking technologies (e.g. VOIP, VPLS, PWE). An important issue now is how to make the transition into a next-generation network, and ongoing operation of that network. Reducing capital expenditure for telecommunication networks by using new technologies means combining the need to simplify the network (i.e. replace or at least converge legacy services such as FR and ATM by new data VPNs) and the drive to increase the range of service types. Understanding and considering the coexistence of old and new can be important. Network planning guides incremental planning to a strategic vision, allowing migration to and ongoing maintenance of a changed network structure.

The (End-to-end) Service Perspective

While telecom markets have become much more mature in terms of competition and customer focus, the services contained in each telecommunications product map less rigidly into a dedicated, associated network technology. A telecommunications product can comprise many different components. Each end-to-end service might make use of different underlying network technologies, e.g. Internet-Connectivity through IP-DSLAM vs. ATM-DSLAM in different access regions of the network, though both connected to the public Internet through an MPLS core.

Furthermore, competition is forcing convergence; various telecommunications services are being migrated onto a shared technology infrastructure. Network planning now usually needs to maintain end-to-end metrics (in particular on service quality), which are calculated across network domains and technologies.

Planning for Network Capacity and Capability

Through 'bandwidth' increasingly being considered a cheap commodity, the importance of 'capacity' as the major measure for network cost has been complemented by networking 'capabilities'. A key decision in network planning is where to put (or co-locate) different network capabilities and how to ensure connectivity with appropriate redundancy levels between them. Modern telecommunications products and their associated services each require access to a number of capabilities. The capability placement decisions, together with the capability requirements for each service, determine the traffic flows in the network. The capability placement decisions, and their associated resilience requirements, strongly impact network cost, both by themselves and through their impact on capacity demand.

The advent of next-generation networks has taken the requirements for network planning solutions far beyond their roots. The focus has shifted away from sophisticated mathematical optimization algorithms derived from graph theory, towards cross-domain network modelling and built-in support for adoptable and repeatable planning processes.

Architecture

Figure 7:
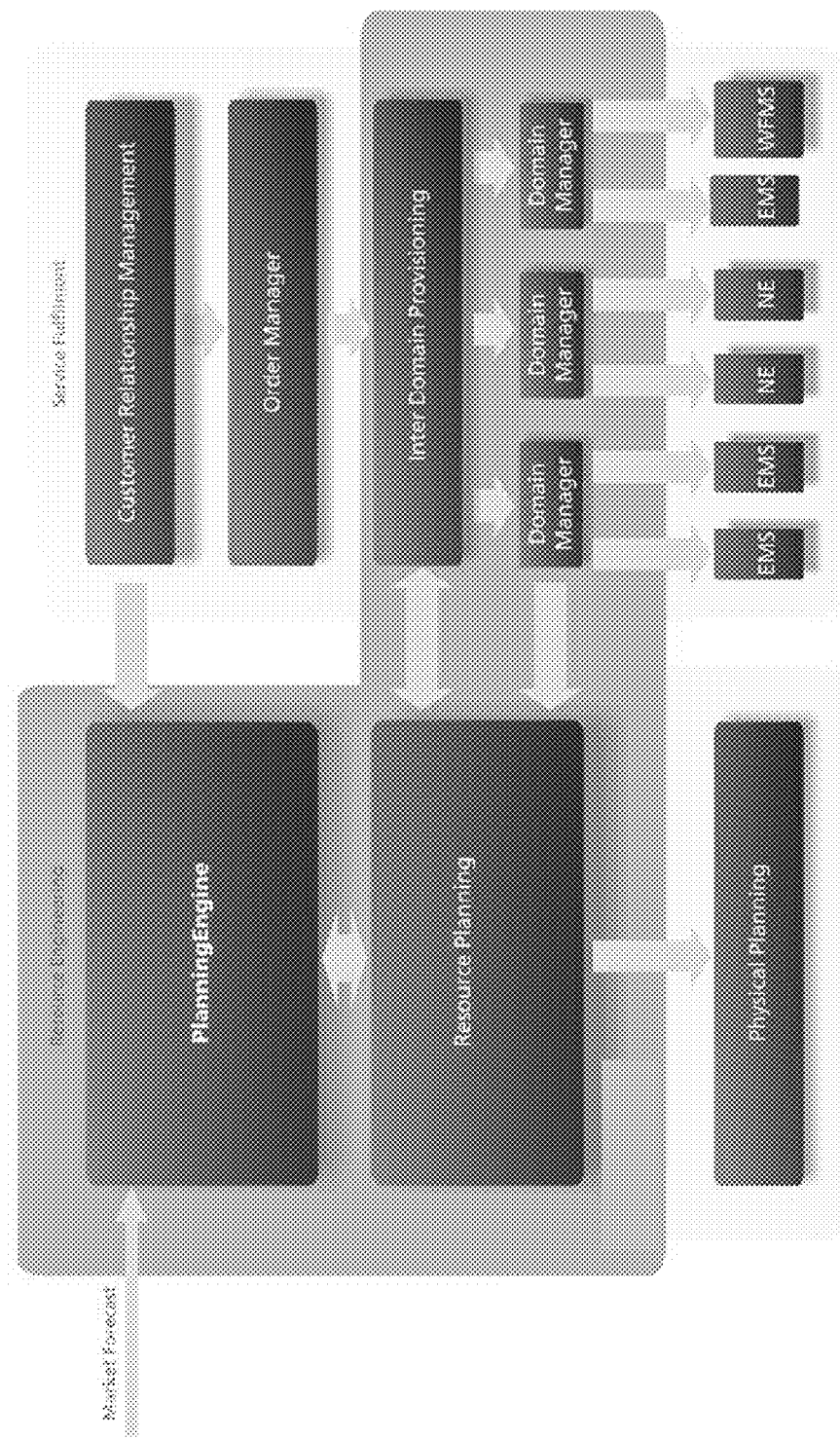
FIG. 7 illustrates a Tier 1 Systems Architecture

The OSS architecture for a Tier 1 operator in the Resource Engineering and Service Fulfilment stacks can be represented as in FIG. 7.

The resource engineering planning stack comprises three components that are relevant to planning network evolution:
  Planning Engine (corresponding to the network planner 10 of FIG. 1)
  Resource Planning (corresponding to the resource planner 12 of FIG. 1). The resource planning component is responsible for low-level planning and implementation of changes in the inventory (and more generally, management of the inventory).
  Physical Planning The Planning Engine is responsible for planning decisions for both major changes and ongoing incremental refinement, based on long-term trends, demands, strategic policy and abstracted network data from Resource Planning. The Planning Engine outputs planning requests to Resource Planning, and generally acts to automate higher level functions required by Resource Planning.

Resource Planning is responsible for converting planning requests into detailed plans. A detailed plan in Resource Planning is actualized by passing physical planning requests to Physical Planning and logical requests to the fulfilment stack. Resource Planning is synchronized with Physical Planning and the fulfilment domain managers and inter-domain manager. Resource Planning will update network planning changes in these domain managers. The Planning Engine extracts and abstracts Resource Planning data to support its function.

Physical Planning is responsible for the physical layout and cabling of the network infrastructure, including power, cooling and space requirements for both outside plant and within buildings.

The present example is concerned primarily with the Planning Engine, within the context set out in FIG. 7. The Planning Engine is designed to facilitate ongoing network evolution and refinement by directing day-to-day growth, in accordance with a strategic intent, using inventory data as a key enabler. This is based on market forecasts and an understanding of the planned network structure and topology and its utilization trends.

General Capability

The Planning Engine is cross-domain and multi-technology. A network may be conceptually split into domains, such as access, backhaul and core. The Planning Engine can enable this split to be defined and adhered to. The network will also typically comprise a multiplicity of layered and intersecting technology topologies. The Planning Engine capability can enable the management of the evolution of these network layers.

Planned extensions to the network are made in the Planning Engine and passed down as planning requests to the Resource Planning platform for detailed design. The network can then be proactively managed according to operational policies. Network utilization data is fed back to planning to complete a closed loop of network evolution.

It is this access to inventory data and coupled process that empowers the Planning Engine process. The Planning Engine can also interact with marketing systems to receive market forecasting data and feedback actual utilization, and with ERP to set budgetary requirements and enable decisions on expenditure.

The Planning Engine can manage networks on a greenfield or brown-field basis, and the ongoing evolution of those networks.

Planning Engine Process

Objects are planned in the Planning Engine at abstract level, for example introduction of locations, or circuits between locations. These abstract objects are managed according to the map stored in the Capability Plan. The Planning Engine is master of these abstract objects for capacity/capability affecting changes, and their introduction to/removal from the network. The utilization of these objects is synchronized with an underlying inventory and held on each object.

Figure 8:
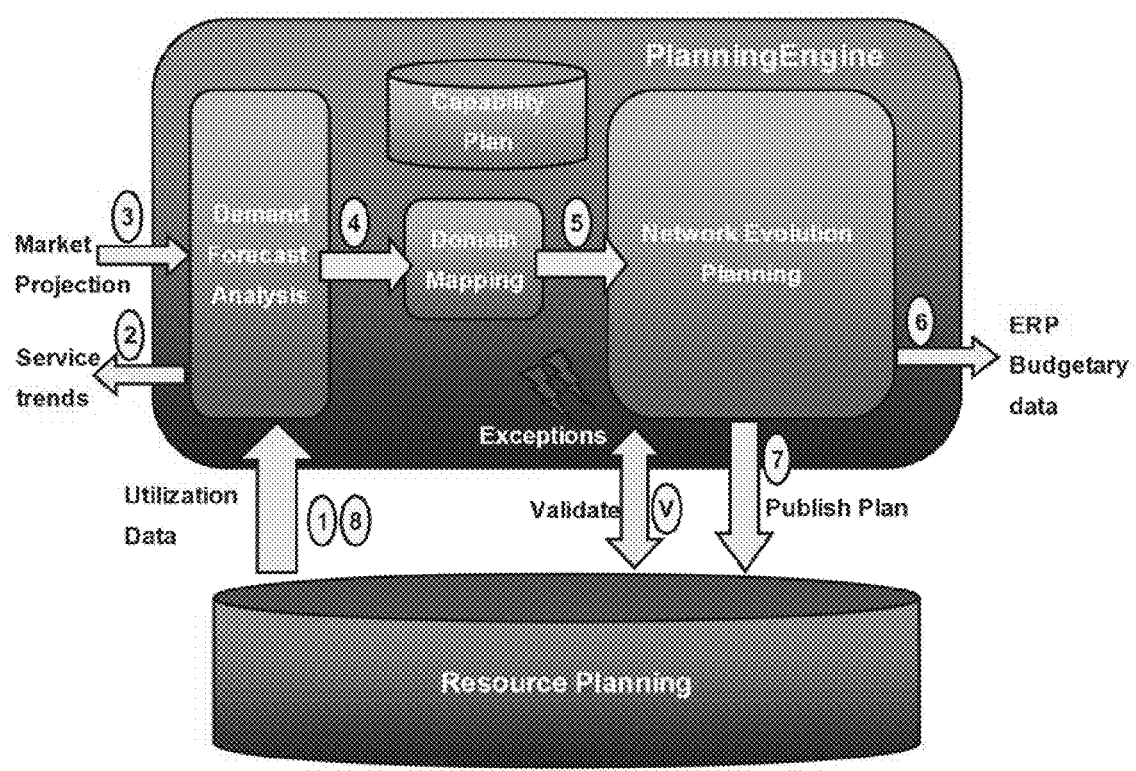
FIG. 8 illustrates a high-level planning process.

The planning cycle is illustrated in simple terms in FIG. 8.

Initially, utilization data is populated in the Planning Engine from Resource Planning (1). The utilization data on an object records utilization over time. The utilization information is updated by marketing forecasts (3), and is used to drive network demand inputs. Marketing forecasts are improved by feeding back service utilization trending data (2).

The service demands are then mapped onto underlying domains using a map of location-based capability—the Capability Plan (4).

The network evolution is then planned (5), for each domain and its capacity requirements. The planning system can be validated against the underlying inventory data, and exceptions raised to the user.

The deltas (i.e. differences) to the abstract network are captured as planning requests. A manual checkpoint and dialogue to ERP systems (6) for budgetary level validation may follow, before the request is passed down to the Resource Planning system for detailed design (7).

The loop with Resource Planning is closed when the utilization data is passed back to Planning Engine (8). A synchronization capability is provided between Planning Engine and underlying Resource Planning to flag any exceptions to this process (V).

Initial data load of the Planning Engine is possible from the Resource Planning system over the same interface, or manually within the Planning Engine.

Use of the Planning Engine

The Planning Engine can facilitate the planning of the future evolution of the network taking input from current network utilization and capacity usage, the projected future network demand and the operator's forward looking technology strategy. The key objective is to facilitate ongoing network capacity and capability management, e.g. adjusting the network to make sure that enough capacity will be available to accommodate the forecasted demand and expected network load.

Typical use cases include:

Network extension

Network capacity and capability expansion in response to projected future traffic growth, evaluation of alternative network structure and architecture evolution options.

Network consolidation

Consolidation of the network based on re-routing optimization aimed at optimizing network utilization, consolidating fragmented service routing and improving network performance.

Network migration

Support for the introduction of new technologies

The Planning Engine applies across all network domains with the objective of determining required changes to the current structure and what additional capacity and capability within the individual domains will be needed in order to support the projected demands. In general, the main use case is the non-greenfield situation, since an existing network (with already installed and partially used network resources) typically needs to be taken into account.

The usage of the Planning Engine is characterized by the following fundamental guidelines:

Network Planning is Performed Against an Abstract Network Model

Network evolution planning is typically carried out on an abstracted view of the network represented in the logical network inventory (e.g. master inventory 14). Abstraction is mainly driven by data aggregation (e.g. bulk object model, collapse) and simplifications. The level of abstraction may vary and depends on the type of use case and application scenario (for example: bulk capacity estimation vs. fine-grained capacity adjustment).

Network Planning is Organized According to Planning Domains

In general, the planning process is organized in a step-by-step fashion and performed against distinct planning domains. These planning domains represent an appropriate partitioning of the overall network, which reflects the different network segments involved in delivering a certain type of service. Each planning domain is characterized by a certain technology (for example ATM, GEthernet, MPLS).

A typical planning domain topology is characterized by a partitioning of the network into a converged packet core and geographically separated backhaul aggregation domains with gateway and service enabling functions at metro nodes.

Figure 9:
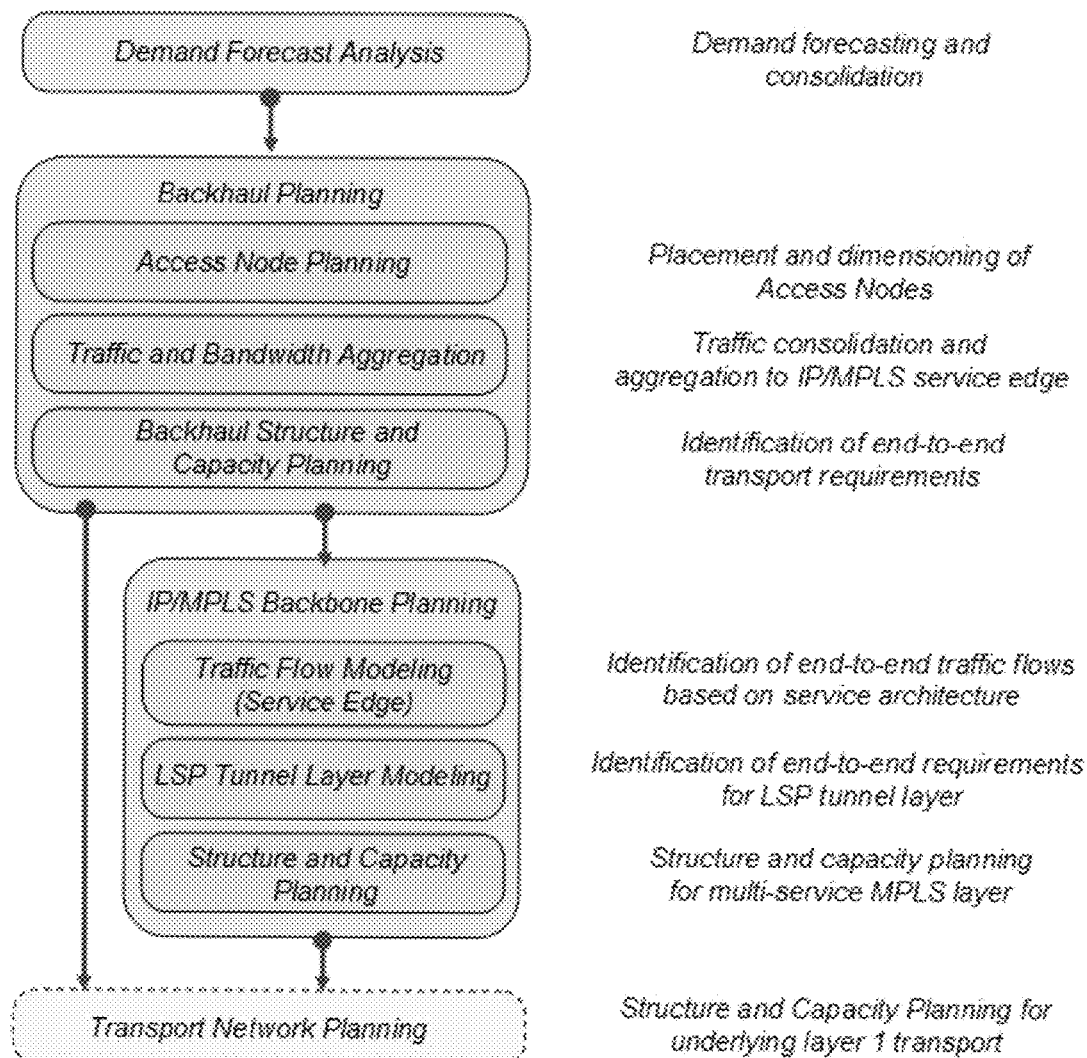
FIG. 9 illustrates an example of a typical planning process (high-level)

FIG. 9 illustrates a typical network planning scenario focused on network capacity extension and indicates potential design steps. In this example the backhaul aggregation segment might be based on ATM technology facilitated by an underlying SDH/SONET transport infrastructure while the packet core network is based on IP/MPLS.

An architectural principle of the solution is to provide a flexible, configurable framework for the Planning Engine. This framework is preferably extensible and comprehensive.

The example is based on a number of assumptions:

For the sake of cross-domain coverage, the Planning Engine operates on a more abstract representation of the network than the inventory does (e.g. by aggregation of circuits into bundles and neglecting time slot assignment)

Planning requirements cover both abstract capabilities for automation and strategic decision-making, and for detailed network design.

Planning results in terms of new equipment build are expressed in terms of (frequently used) building blocks for network elements (so-called standard builds). Detailed configuration choices should preferably be made in detailed resource planning, but could also be incorporated into the Planning Engine.

The traditional focus of network planning is strategic. It was undertaken occasionally, with target network design driven by mathematical optimization (primarily operating on a minimum cost metric). The approach proposed herein considers network planning as a continuous process. It frees the user from the majority of repeated planning tasks. It improves the significance of the results by starting from a more recent view of the network (from the inventory).

Differentiators

This section describes aspects where the present approach for planning is different from existing approaches.

Planning Integrated with Inventory

Traditionally, network planning is performed offline. The gap in functionality and data between the NMS and the planning applications is too wide for simple upload interfaces. Mediation to the various NMSs and an additional consolidation function are too expensive.

Additionally, driving an offline planning system from out of date snapshots of the network increases the risk of failure.

The present solution for planning uses the inventory functions (in particular the master inventory 14 or inventory model 126 as shown in FIGS. 1 and 4), to keep the data accurate and enabling an effective network engineering process.

From Once-only Design to Repeatable Processes

Traditionally, network planning is performed on a network-snapshot, with optimization determining near-simultaneous, one-off, local optimizations in order to achieve an approximate global cost minimum for the network captured in the snapshot. The lifecycle of planning consisted of a sequence of usually un-correlated snapshots.

The present solution can support a repeatable planning process, both in a periodic and perpetual manner. In particular, planning decisions can be stored, re-used in repetition runs and can be open for re-evaluation.

Each planning proposal typically requires many atomic decisions, each of which is usually a selection of a very limited number of options (e.g. should there be a direct link on layer x between location A and B?). The present solution builds an audit trail of decisions, and allows rollback of these decisions and capture of processes as templates.

In that respect, the Planning Engine preferably also stores a repository of planning decisions, whose re-use is enabled via process templates.

Capability in Complement to Capacity

Traditionally, network planning focuses on network capacity, i.e. the objective is to determine the necessary capacity within and between locations, on a per domain basis. The objective of planning was to determine a (cost-)minimized network i.e. an appropriate network topology and associated capacities (on a per layer basis). 'Cost of capacity' was the driving force.

The present solution for planning preferably combines network 'capabilities' (such as voice call features in the call servers) with network capacity and QoS-related network metrics. This implies a cost model which can contain cost items that are not capacity-related at all.

From Domain-specific to Cross-domain Optimization

Traditionally, network planning follows a sequential process, optimizing the overall network in a sequential layer-by-layer process.

From a pure capacity perspective, this de-composition approach can work. However, as a single end-to-end service now travels across various stacks of network technology, the present approach preferably supports:
- a cross-domain cost model allowing comparison of different solutions
- end-to-end and cross-domain resilience analysis function Optimizing networks in a cross-domain sense can be a complex task. A two-step approach can help:
- a cross-domain metric (in terms of both end-to-end cost and end-to-end QoS/resilience quantifiers) can be used; such a metric can allow for comparing different options and provide a framework for 'simple', rule-based planning procedures
- on top of the cross-domain metric, 'true' cross-domain optimization procedures could be built, which attempt to propose the appropriate distribution of network capabilities and capacities across network domains Many COTS products for planning are dedicated to a subset of network types e.g. mobile wireless or fixed wireline. Consolidation of historically grown networks onto converged platforms will typically result in a mix-and-match of network technology stacks.

The present solution for planning is preferably configurable in terms of the network technology stack it can support.

Solution Architecture

The proposed Planning Engine solution comprises a set of interacting solution components. Each of these components accesses data in a common repository and provides a consistent interface through APIs, the Process Engine and through the GUI. The solution components are illustrated in FIG. 10.

Figure 10:
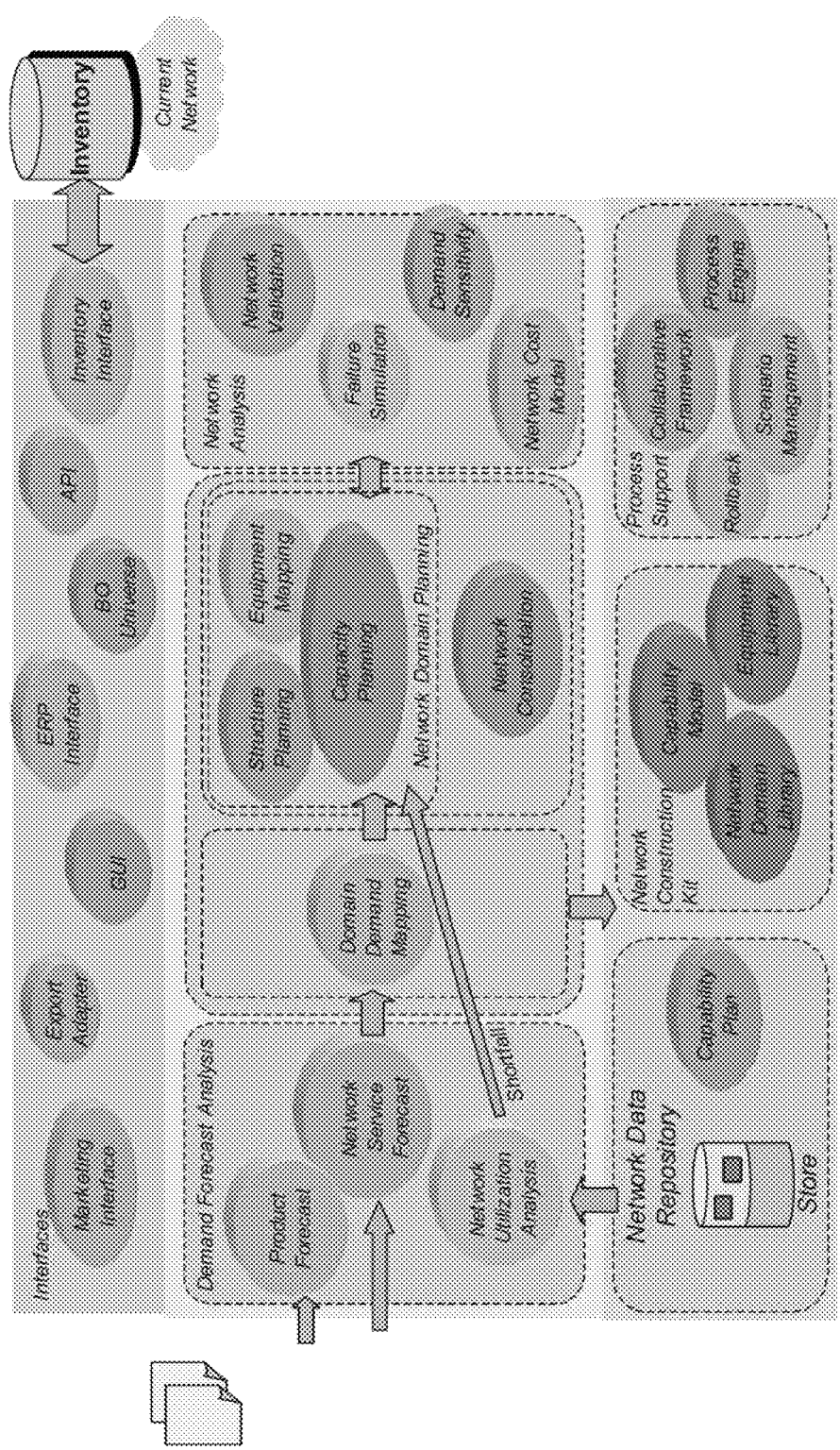
FIG. 10 illustrates solution components of an example implementation of a network planning application.

The solution architecture is conceptually split into three tiers as shown in FIG. 10. There is a data tier, an application tier and an interfacing tier. Within these tiers, there are a number of major blocks and sub-components. These are listed below:

Demand Forecast Analysis—this comprises demand forecasts due to Network utilization and Market forecasting, and the amalgamation of these demands into a common framework of service demand matrices in Network service forecast.

Domain Demand Mapping—this maps the service demand onto each domain.

Network Domain Planning—Equipment Mapping resolves the demand on a domain onto the supporting network resources, without the need for the detailed equipment models found in Resource Planning. Management of the topology of the network is undertaken in Structure planning. Comparison with current utilization data in the data repository leads to delta capacity plans, managed in Capacity planning.

Network Data Repository—comprises the data supporting planning. The Data Store comprises the network data on which planning takes place at the level of abstraction required for planning purposes. The Capability Plan describes the strategic intent in terms of location and technology capability and domains. It provides a simple yet comprehensive way of modelling, at a summary level, a large-scale telecommunications network. This allows the strategic network planners to decide the strategic intent of the network and its exploitation policy at the outset of network design. It then directs the ongoing plan of the network to be constructed in accordance with these rules. These rules are derived from a common network strategy, which also determines how the network is utilized. They are captured as data and are applied either as network is constructed automatically or manually.

Historically, it has not been possible to adopt a bottom-up approach to summarizing network models based upon ITU-T G.805 and TMF 513/608/814. This bottom-up approach has struggled because of a lack of abstraction, so attempts have tended to focus on solutions that preserve the greatest amount of information.

The Capability Plan uses a top-down approach, taking into account the operational (or business) and technical requirements, which are validated as supporting the needs of the network resource operator and Service Provisioning architecture. The absence of detail in the model means that it does not need to be permanently synchronized with the Resource Planning system, providing a level of decoupling that benefits the overall architecture.

Network Construction kit—this describes the rules by which the data in the store is constructed, and is composed of three sub-component libraries: Domain library, Equipment library and Capability Model.

Process Support—comprises Scenario Management which describes the rules by which planned scenarios are managed within a time-line, Collaborative framework which manages user access and responsibility, Planning Records and Rollback which captures changes and enables rollback, and Process Engine which can be used to capture processes with automatic and manual intervention.

Network Analysis—comprises Network Validation which provides the capability to analyze network designs with respect to their compliance to the intended planning rules, Failure Simulation which provides the capability to analyze and verify the current network or a proposed network design for the extent of network failures, Demand Sensitivity which provides a sensitivity analysis of network forecasts based on variations in service forecasts from marketing or network utilization, and Network Cost Model which provides a framework for describing a network and its sub-items in terms of 'cost'. The network cost model allows for assigning cost to both capacity and capability related network items. It supports cost items of both capital and operational expenditure. It thus can deliver expenditure data for profit/loss related calculations as well as for cash flow/investment related calculations.

The cost model delivers both
- individual cost figures, i.e. a list of all cost items associated with a single network object and
- aggregate cost figures, i.e. it sums up cost of certain categories ('all capital expenditure for equipment of type Edge, Metro and Core')

In addition, it works as a server to fill cost attribute values for all sorts of algorithms (routing, topology optimisation). Cost information is generally owned across systems, at differing levels of granularity and for differing purposes. The cost model used internally for making planning decisions is based on real world costs assigned to equipment and capacity. Asset management systems or ERP systems can manage such costs, which implies that the Planning Engine can preferably liaise with these systems to build and maintain its cost model. Cost information maintenance may be manual.

Interfaces—comprises GUI which defines a user interface to facilitate user interaction, API which defines a comprehensive application programmable interface for undertaking all planning activities, a Marketing interface that supports reports on actual service utilization trends to aid marketing forecasts, an ERP interface that supports the publishing of proposed plans for budgetary approval, a Business Object Universe for extra reporting requirements, an Export Adapter to allow scheduled, scoped export of data to external systems and Inventory Interface which defines an interface to enable the utilisation of inventory data and a coupled process between planning and inventory. This two-way interface comprises extraction from the inventory for data population and validation, and a publish plan capability to the inventory.

The above sets out the structure of the Planning Engine in overview in terms of constituent components and their functions. Some aspects of the Capability Plan component and interface components will now be described in more detail.

Capability Plan

The removal of capacity management responsibility from the Capability Plan can help to create a summary model of the network. Without capacity to consider, detailed logical and physical information can be omitted.

The Network Capability Plan can be modelled using six basic objects:
- Network Domains
- Area Locations
- Physical Capabilities
- Site Locations
- Technology Capabilities
- Logical Capabilities Each object type can be sub-typed so that a particular Capability Plan can be adapted to address specific technologies or provide an appropriate level of granularity. This is achieved in the Capability Model. For example, specialist Technology Capabilities (and Logical Capabilities) are normally created for MPLS, Ethernet, and so on. However, it is possible to go further and create network roles, such as backbone and access within the Technology Capabilities if required.

Figure 11:
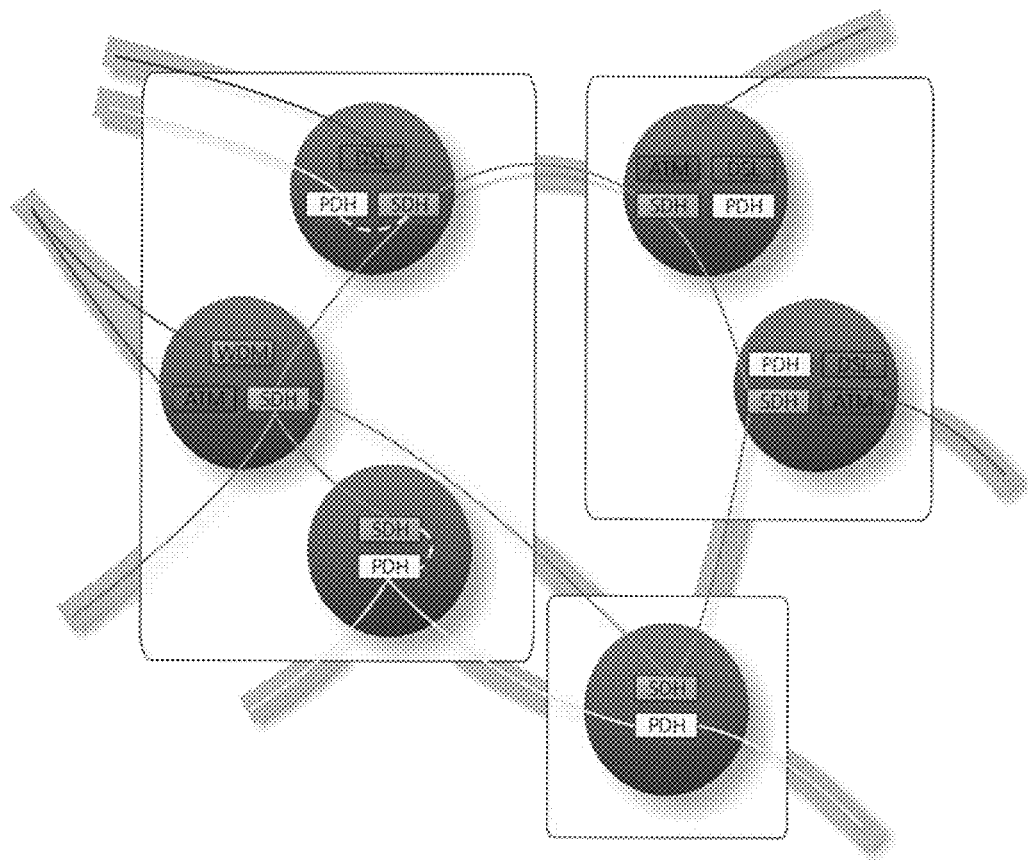
FIG. 11 illustrates an example of a Network Capability Plan.
Figure 11:
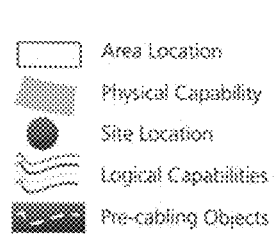
Figure 11:

FIG. 11 shows schematically how they might be related in a particular implementation of a Capability Plan. The following sections define the function of each element in the Capability Plan.

Network Domains

Figure 12:
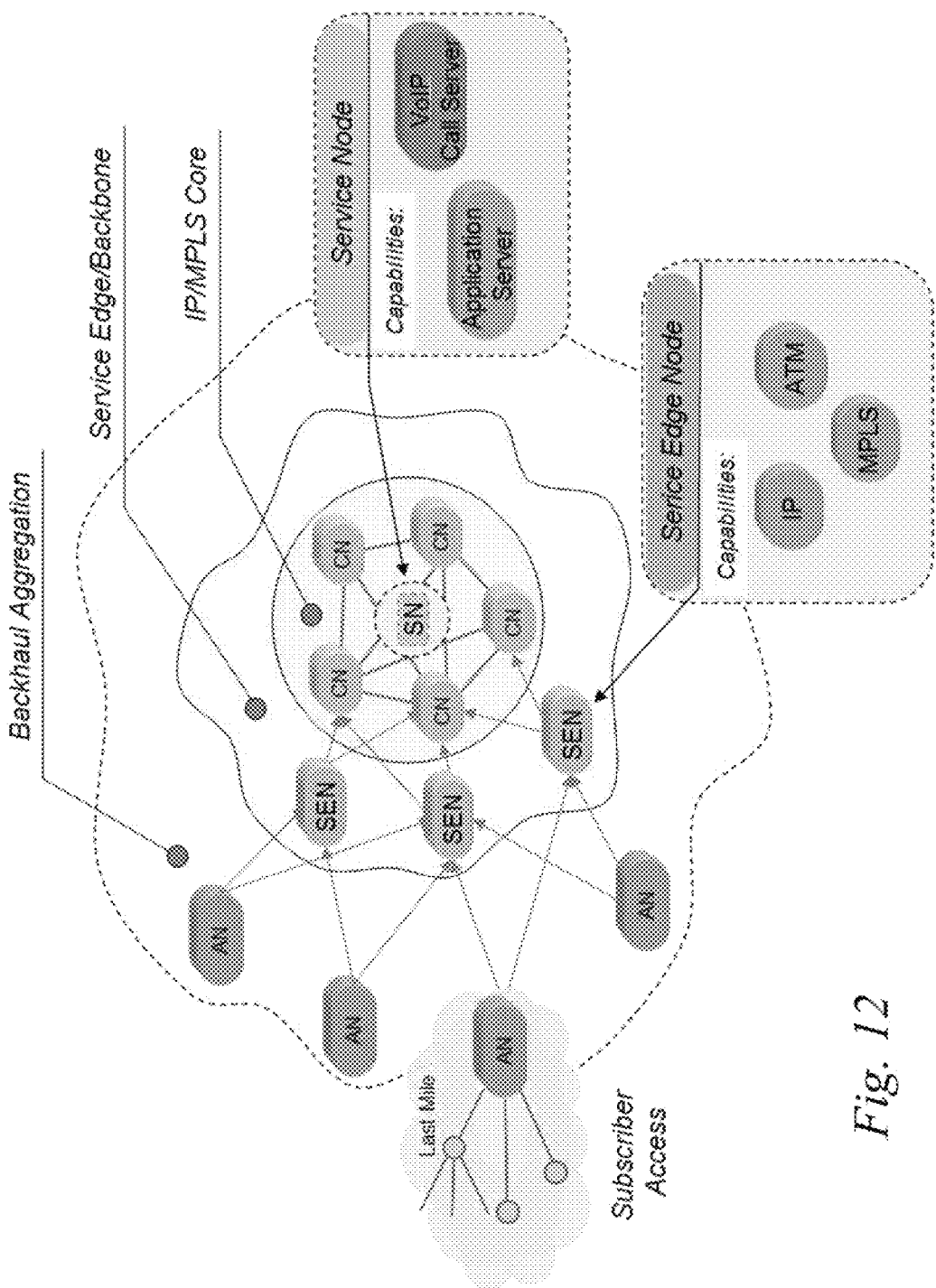
FIG. 12 illustrates partitioning a network into domains and classifying nodes.

Planning Domains group together locations of like purpose. These represent a flexible method of splitting the network into functional blocks. For example, Access domain, backhaul domain and core domain are useful splits of a next-generation network (an example of this is illustrated in FIG. 12).

The domain is then used as a method of dynamically classifying locations.

Area Location

This represents an administrative arrangement of other Area Locations and Site Locations. An important concept associated with an Area Location is that all Logical Capabilities (see below) that exist at Site Locations within Area Locations can be connected without recourse to outside agencies. This delegation of responsibility to local field engineering enables the Capability Plan to summarize its model further because local physical connectivity between technical domains can be omitted from the model.

Therefore, an Area Location has a single operational owner from a physical planning perspective. Area Locations may be hierarchical so that complex physical and organizational structures can be represented.

Site Location

A Site Location is a place where equipment can be located. However, as no actual equipment is referenced in the Capability Plan, this concept has some flexibility. It may be a central (CO), a point of presence (POP) or a customer location. A site location usually represents an equipment room, not necessarily a site.

Interconnections within a location can be assumed or can be explicitly captured between abstract devices. Non-connectable floors can be captured by explicitly excluding such interconnections.

A Site Location may contain a number of Technology Capabilities.

Physical Capabilities

This represents the high level or strategic view of the location. It includes the routes between Area Locations, which is a technology independent indication of the potential physical connectability of Area Locations. It is similar in concept to strategic cables or ducts.

It also includes an aggregated record of the space, power and cooling that is present at the location and is available for use by new network facilities. This gives the planner a good indication of what capability can be deployed at a location and the extent it can be used for strategic growth.

Technology Capability

This is an abstracted view of technology that is present or that is strategically available at a Site Location, and represents the capability of the network.

Note: The presence of a Technology Capability does not imply the presence of equipment or capacity. It implies that the location can be used to site equipment with a particular capability.

Logical Capability

Technology Capabilities are connected by Logical Capabilities. They are logical pathways in the network. They represent the aggregate of all connections that join things together and record the total capacity provided by the aggregated Technology Capabilities and the capacity available for new service.

In overview, the Capability Plan can provide the following functions & capabilities:

Provide an abstract framework for the global optimization of network planning decisions.
  Identifying placement of node/locations and their role within the network architecture
  Identify capabilities available at each node/location ('capability map')
  Identify the high-level network architecture and structure in terms of partitioning the network into geographic areas (domains, sub-networks), for example Access area, Backhaul aggregation area and IP/MPLS backbone area
Apply the network exploitation policy decided upon during strategic network design when planning network evolution.
Enable existing network configurations to influence future network build decisions in order to minimize operational and capital expenditure.
Minimize the data and processing overhead required to maintain the model.

Capability Model

The Capability Model comprises the rules by which the Capability Plan is constructed.

These rules are captured as metadata and are applied as the Capability Plan is constructed automatically or manually. For example, location types can be defined in metadata, with the associated allowed capability types. The Capability Plan will then construct data instances of locations of a given type, with capabilities as permitted.

The effect of these metadata restrictions may be configurable. For example, certain rules may be mandatory, others are recommendations with warning levels. This will allow the user to knowingly build local instances that do not follow the intent of the capability plan. The Network Validation component provides functionality to report on deviations from the capability model.

The rules can be grouped into the following types, which define the policy decisions to be captured:

Domain classifications—Define the available domain types, such as Access, Backhaul, Core.
Site classifications—Define functional classes for locations such as Access Node, Metro, Core, Service
Technology classifications—Functional classes for devices and circuits based on the supported technology.
Data restrictions based on data type, domain, site and technology classification—For example, device types, standard builds, circuit types can then be associated with these classifications. e.g. a MarconiSmallMetro location type is a Metro class site. MPLS circuits can only terminate on MPLS devices (technology classification) at Core or Metro sites (site classification).
Connection cardinality between sites—based on the site classes and connection types (e.g. Metro sites are dual-homed to Core sites).
Connection ordinality of sites—determining the containment hierarchy, e.g. Metro Node site also implies an Access Node capability.
Service type/Domain mapping—allowed service types for a domain Some details of the interface components are set out below.

GUI

The Planning function preferably provides a complete GUI implementation to facilitate user interaction. Users can preferably browse data, manage planning objects, report on plans and planned network and manage the planning cycle. Low and high level planning functions are supported in a controlled manner via wizards.

Each solution component is preferably delivered by using a coherent set of one or more GUI Tools, e.g. wizards to create data items and interactive, navigable reports on the data. The specific types of tools will vary for each solution component.

The following functions and capabilities are preferably provided by the Planning Engine GUI.

Look and Feel should preferably be suitable for use by planning operatives who are not necessarily computer experts.
Architecture
  The architecture allows flexible creation and manipulation of the user interface
  A full Web client is preferably provided, compatible with Microsoft Internet Explorer (TM) or other available web browsers
Integration
  Flexible full web access is preferably available to all applications Export Adapter A packaged capability may be provided to allow export of data from the Planning Engine.

The scope of data is preferably configurable, and the export preferably has a scheduler for initiation.

API

A comprehensive API is preferably provided for undertaking all planning activities. The wizards within the Planning application also make use of these APIs. These APIs exist at each logical layer of the application, providing flexibility in terms of automation (lower level API calls) and integration (coarse-grain service-based interfaces).

The API preferably includes the following functions and capabilities:

Low level API for writing to data tables.
Higher level EJBs for methods on the data
Web Services for external interfaces
XML-based coarse grain interfaces
Maintains a log of API calls
Maintains a log of exceptions Inventory Interface One feature of the proposed Planning Engine is the ability to utilize inventory data and provide a coupled process between planning and inventory.

The interface between planning and inventory is a two-way interface with three modes of interaction:

Data population: Planning retrieves data from the inventory to populate its data repository with initial data and thenceforth with ongoing utilization data
Data validation: Planning retrieves data from the inventory to validate the state of its repository (especially before issuing a planning request)
Publish Planning Request: Planning initiates requests, updates and cancellations of planned network alteration These three modes may be further classified as an Import/Validate Strand, and a Planning Request Strand.

Figure 13:
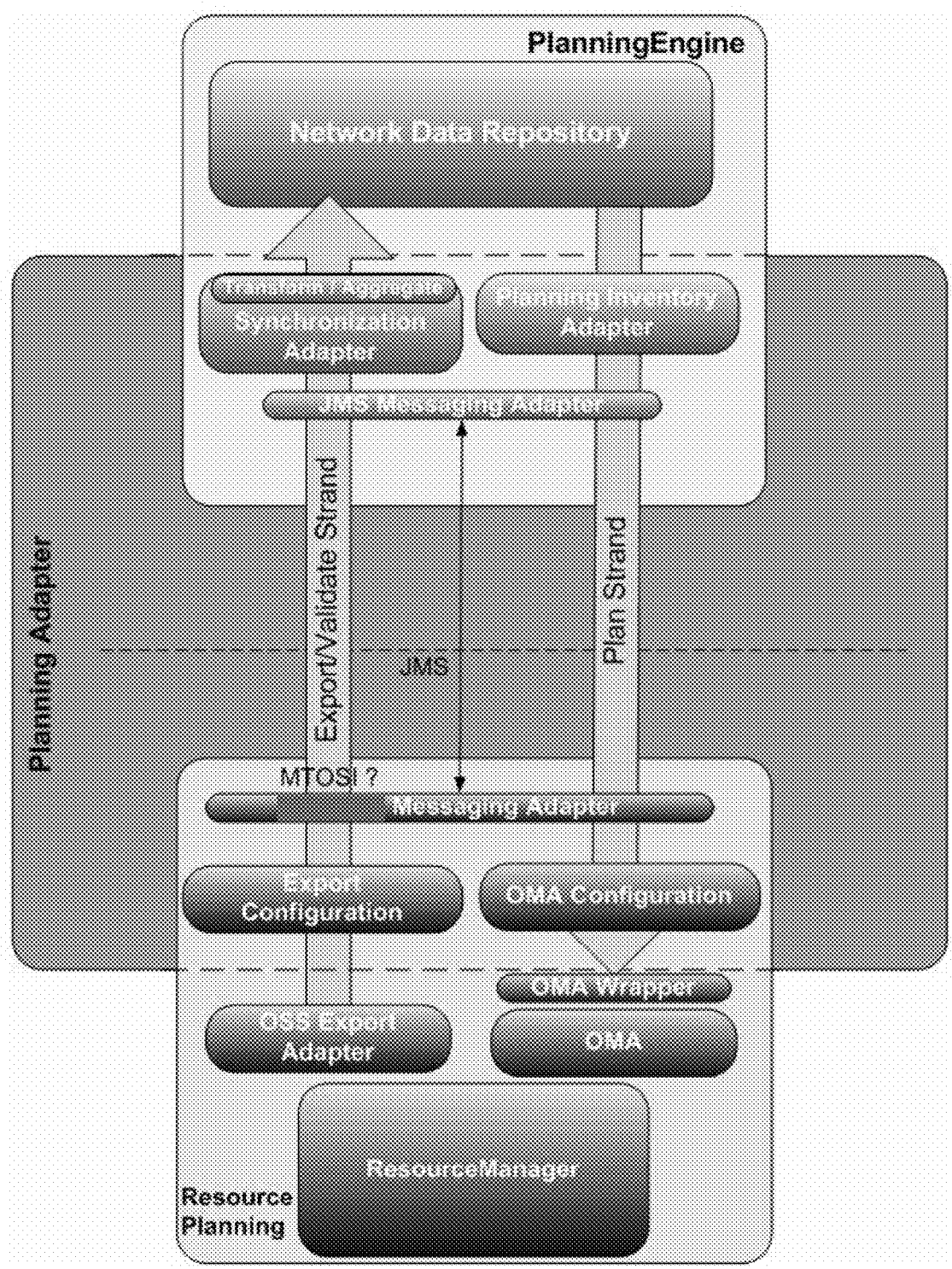
FIG. 13 illustrates the planning/inventory interface.

This is shown in FIG. 13, which illustrates the planning/inventory interface.

The Export/Validate strand is initiated in the Planning Engine to retrieve data from the inventory. This may be either for an initial (or new) load of data, or for a targeted validation of a portion of network on which a scenario has been constructed. This data extraction is preferably MTOSI compliant.

The data is abstracted using transformation and aggregation. This abstraction is as specified below:
  Sites/devices:
    Port data is aggregated by type
    Device structure is not passed at all
  Circuits:
    Circuit timeslots and timeslot mappings are not held
    Circuits may be aggregated into n x bandwidth connections between locations, or individual connections between locations.
    No customer circuits are passed over the interface, just utilization.

Planning may require common terms of reference for the data passed over the interface. This is achieved by a mapping between the systems that is not necessarily 1-to-1 due to the data abstraction.

The Plan strand is to initiate new build requests, updates and cancellations from Planning, and accept Plan status updates from Design. These requests take the form of requests for:
  Site capacity (number of terminations by type, standard build)
  Link capacity A to Z (technology, CoS, protection), with underlying node-to-node routing
  Topology structures (device/circuit mesh)

Some functions and capabilities of the Inventory Interface component are set out below (these may be provided independently or in any combination):
  Import/Validate Strand
  Data Retrieval
    The inventory provides an export capability of data to Planning, on demand. The exports will be either a complete record of the relevant data objects, or the 'deltas' since a defined time. The delta export is a record of those objects to have changed since a specified date. Create deltas and Update deltas are defined as those objects to have changed since the specified time (i.e. not a record of the change, but a record of the object following the change). Delete deltas are a set of deletion actions (or state changes to 'pending delete'), with associated object ID.
    Exports are scoped according to:
      Object type (sites, circuits, topologies).
      Modified flag (for delta exports)
      Object status (e.g. do not include 'Planned' objects, do include 'Pending' or 'In Service').
    The data export is preferably configurable and flexible.
    The data export preferably accepts scoped requests for data. The data request is initiated from Planning, and may be scoped down to a subset of data (to support the validation for a specific scenario).
    The data export preferably adheres to the MTOSI standard.
    The data from the inventory source is aggregated into abstracted forms for planning, i.e. aggregation transforms are applied.
    The import into planning populates the data repository with a new data version.
    Errors during load are captured and displayed
    The load process supports an abort, should the errors be considered too serious Planning supports validation checks of the new data, once the load data is successfully stored in the data repository. Validation includes referential integrity checks, attribute checks and simple network connectivity checks.

The existing plan scenarios may be migrated onto the new data view

The Planning system supports the deletion of the old data version, once obsolete.

Plan Strand
Planning Request
The Planning Engine supports the construction and passing of a Planning Request to the inventory/Resource Planner, manually initiated or via API.
A Planning request supports the following types:
  Build Site: a description of a site requirement (standard build type, number of ports of type)
  Build Capacity: a description of a (circuit) capacity requirement, CoS, Protection, and the underlying abstract routing through the network
  Build topology
Resource Planning handles Planning Requests. On receipt of the build plan message, the underlying Resource Planning will generate an Order object corresponding to the plan. In addition to the order object, a project will be created per top level element (n x Location, or n x Circuit). A default project type is preferably supplied for each of these:
  Build Plan—Location
  Build Plan—Capacity
  Build Plan—Topology
  Reroute:—circuit ids
Planning Request Update
The Planning Engine supports the construction and passing of a Planning Request update to the inventory, manually initiated or via API.
A Planning request update supports the same types as a Planning Request
A textual 'Reason' may be sent with the update
Cancel and submitting a new Plan may be used for any substantive update
Planning Request Cancellation
The Planning Engine supports the cancellation of a Planning Request (manually initiated or via API), and sending a cancellation to the inventory.
A textual 'Reason' may be sent with the cancellation
Plan Status Update Event
The Inventory may be configured to support a status update message of 'Abandoned' or 'Completed'
The Planning system supports the receipt of the Status Update Event and logs it on the Plan.
The above functions may use the following data items:
  Site: a description of a site requirement (standard build type, number of ports of type)
  Circuit: a description of a (circuit) capacity requirement, CoS, Protection, and the underlying abstract routing through the network
  Topology
ERP Interface Plans for network enhancements or changes can have significant impact on Network Engineering budgets within a telecommunications service provider/network operator. Planning decisions are therefore preferably visible to ERP systems. Furthermore, many network operators have a checkpoint in ERP with a go/no-go decision point for any major plans.

The level of detail held in the Planning Engine is typically insufficient to supply a full bill of materials to ERP. For this level of detail, Resource Planning may be a better source of data. The Planning Engine preferably does hold high level costing data, and can approximate the timing and cost of adding new capability at a location. This can typically be useful for setting budgets for the year ahead etc., rather than for proceeding with a specific equipment order.

To support these business functions, the Planning Engine preferably supplies plan data for new build, and at least supplies a holding state for plans in the Planning engine, awaiting a go/no-go decision. Optionally, this interface can be automated.

The following data items may be used by this component:
Approximate equipment costings based on location/node/port costs.
Pending state for Plans
Marketing Interface An external Marketing function may supply market demographic data, or product and network service forecast data into the Planning Engine's Demand Forecast Analysis components.

As marketing forecasts are often distrusted within the telecommunications community, the Planning Engine can also supply data on Service Utilization trending back to Marketing. This information can provide an effective feedback mechanism which can enable forecasting to be improved.

The interface for Marketing data import into the Planning Engine is via file import. The file format is XML, according to a predefined schema.

The interface from the Planning Engine to Marketing may be a report of Service Utilization trending, made available to the external system.

Some functions and capabilities of this component are set out below:
The Planning Engine supports the publishing of Service Utilization Trending data to marketing
The data is preferably formatted and human readable, as a report
The Planning Engine preferably supports at least file-based import of market demographic data or product and network service forecast data
The data format may be XML The above describes features of an example implementation of the network planning application 10. However, the network planning application can be implemented in a variety of different ways.

More generally, it will be understood that the present invention has been described above purely by way of example, and modification of detail can be made within the scope of the invention.

The invention claimed is:

1. A system, comprising:
memory storing an inventory database, the inventory database storing a network inventory comprising information representative of a plurality of modeled entities, where each of the modeled entities represents one or more of a device of a communications network, topology data of a communications network, and service data of a communications network;
a processor coupled to the memory, the processor executing an inventory update component for:
receiving a plurality of change requests from a plurality of different network management applications of the system, the plurality of different network management applications including a network design application, a network resource management application, a network planning application, a service provisioning application, and a reporting application, and each of the change requests specifying a modification to be made to the communications network;
modifying one or more of the plurality of modeled entities stored in the network inventory by the inventory update component in response to the change requests; and
outputting to a network implementation component a plurality of change records including a first change record and a second change record based on the modification made to the network inventory in response to the change requests, where each of the plurality of change records defines a change made within the network inventory to one of the plurality of modeled entities responsive to the change requests, and where:
the first change record specifies a first modeled entity of the plurality of modeled entities, an attribute of the first modeled entity, and a first modification of the attribute of the first modeled entity in response to the change requests, where the first modeled entity includes the device of the communications network, and
the second change record specifies the first modeled entity, the attribute of the first modeled entity, and a second modification of the attribute of the first modeled entity in response to the change requests;
the network implementation component for:
accumulating the plurality of change records;
processing the accumulated change records responsive to a predefined event, the predefined event being the plurality of change records having a threshold number of change records, and the processing including generating at the network implementation component a set of network configuration actions that correspond to the plurality of change records, the set of network configuration actions including configuration commands for the first modeled entity, the generating including:
combining the first change record and the second change record into a single network configuration action based on a determination that both the first change record and the second change record are associated with the first modeled entity, where the single network configuration action includes specific instructions in a predetermined format specific to the device of the communications network to be implemented by the device for configuring the device of the communications network;
transmitting the set of network configuration actions to the communications network;
implementing the set of network configuration actions at the communications network, including carrying out the specific instructions associated with the device of the communications network to perform one or more changes to the device of the communications network and in response to carrying out the specific instructions, transmitting an acknowledgement from the device to the network implementation component that the specific instructions were received including:
(i) when the one or more changes to the device are successfully completed by the device, the acknowledgement indicating that the one or more changes to the device were successfully completed, and
(ii) when the one or more changes to the device are not successfully completed by the device, the acknowledgement indicating that the one or more changes to the device were not completed; and awaiting receipt by the network implementation component that the specific instructions were received and that the one or more changes to the device were successfully completed before proceeding with further network configuration actions that include modifications that are dependent on the one or more changes;

wherein utilization of network resources in the communications network is analyzed, and changes to the communications network are planned in dependence on the outcome of the analysis.

2. A system according to claim 1, wherein the network implementation component is adapted to generate the configuration data in dependence on the latest configuration of the first modeled entity retrieved from the inventory database.

3. A system according to claim 1, wherein the inventory update component is adapted to select one of a plurality of stored scripts in dependence on the change requests, each script specifying inventory modification actions for performing a given modification, and executing the modification actions specified by the selected script in the inventory database.

4. A system according to claim 1, wherein the eae-er-4% ere change requests relate to changes requiring external action in addition to inventory updates.

5. A system according to claim 1, wherein the configuration actions comprise configuration commands for network devices, and the network implementation component transmits the configuration commands to the network devices.

6. A system according to claim 1, wherein the network inventory provides a model of the communications network, the model defining network entities, attributes of the network entities and connections between the network entities, where inventory update requests expressed in terms of the model are received and database update requests corresponding to the inventory update requests are issued to the database.

7. A system according to claim 1, wherein the network resources are associated with a plurality of connection resources between a plurality of network locations of the communications network, the configuration data defining changes to the connection resources.

8. A system according to claim 1, wherein accumulated change records are processed in a batch process in response to a predefined event, such that the net modification of the first modification and the second modification is implemented in the communications network and the communications network is matched with the network inventory in response to the predefined event.

9. A system according to claim 1, wherein the planning of changes to the communications network includes mapping service demands onto domains using a map of location-based capabilities.

10. A method, comprising:
storing a network inventory comprising information representative of a plurality of modeled entities, where each of the modeled entities represents one or more of a device of a communications network, topology data of a communications network, and service data of a communications network;
receiving at an inventory update component a plurality of change requests from a plurality of different network management applications of the system, the plurality of different network management applications including a network design application, a network resource management application, a network planning application, a service provisioning application, and a reporting application, and each of the change requests specifying a modification to be made to the communications network;
modifying one or more of the plurality of modeled entities stored in the network inventory by the inventory update component in response to the one or more change requests;
outputting from the inventory update component to a network implementation component a plurality of change records including a first change record and a second change record based on the modification made to the network inventory in response to the change requests, where each of the plurality of change records defines a change made within the network inventory to one of the plurality of modeled entities responsive to the change requests, and where:
the first change record specifies a first modeled entity of the plurality of modeled entities, an attribute of the first modeled entity, and a first modification of the attribute of the first modeled entity in response to the change requests, where the first modeled entity includes the device of the communications network, and
the second change record specifies the first modeled entity, the attribute of the first modeled entity, and a second modification of the attribute of the first modeled entity in response to the change requests;
accumulating the plurality of change records;
processing the accumulated change records responsive to a predefined event, the predefined event being the plurality of change records having a threshold number of change records, and the processing including generating at the network implementation component a set of network configuration actions that correspond to the plurality of change records, the set of network configuration actions including configuration commands for the first modeled entity, the generating including:
combining the first change record and the second change record into a single network configuration action based on a determination that both the first change record and the second change record are associated with the first modeled entity, where the single network configuration action includes specific instructions in a predetermined format specific to the device of the communications network to be implemented by the device for configuring the device of the communications network;
transmitting the set of network configuration actions to the communications network;
implementing the set of network configuration actions at the communications network, including carrying out the specific instructions by the device of the communications network to perform one or more changes to the device of the communications network and in response to carrying out the specific instructions, transmitting an acknowledgement from the device to the network implementation component that the specific instructions were received including:
(i) when the one or more changes to the device are successfully completed by the device, the acknowledgement indicating that the one or more changes to the device were successfully completed, and
(ii) when the one or more changes to the device are not successfully completed by the device, the acknowledgement indicating that the one or more changes to the device were not completed;

awaiting receipt by the network implementation component that the specific instructions were received and that the one or more changes to the device were successfully completed before proceeding with further network configuration actions that include modifications that are dependent on the one or more changes;
analyzing utilization of network resources in the communications network; and
planning changes to the communications network in dependence on the outcome of the analysis.

11. A method according to claim 10, wherein the analyzing and planning comprises:
measuring the utilization of the network resources in the communications network over time;
analyzing the measured utilization over time of the network resources to determine a utilization trend;
predicting future utilization of the network resources using the determined utilization trend; and
planning changes to the network in dependence on the predicted future utilization.

12. A method according to claim 11, wherein the predicted future utilization for a type of resource is calculated in dependence on the predicted future utilization of the network resources and in dependence on one or more adjustment parameters.

13. A method according to claim 12, wherein the one or more adjustment parameters includes at least one of a global adjustment parameter, a local adjustment parameter, and a service trend adjustment parameter.

14. A method according to claim 13, wherein the one or more adjustment parameters includes the global adjustment parameter, and the global adjustment parameter is associated with economic predictions.

15. A method according to claim 10, further comprising:
storing a service inventory, the service inventory being derived from the network inventory and containing information used for provisioning of services in the communications network; and
provisioning services in the communications network using the service inventory.

16. A method according to claim 15, wherein provisioning a service comprises:
modifying the service inventory in dependence on the service being provisioned; and
configuring the communications network to provide the service in dependence on the modified service inventory.

17. A method according to claim 16, wherein provisioning the service comprises generating configuration information in dependence on the service inventory modification, and transmitting the configuration information to one or more of the network resources in the communications network to configure the network resources to provide the service.

18. A method according to claim 15, further comprising updating the service inventory in response to changes in the network inventory.

19. A method according to claim 15, wherein the network inventory stores service-related data for determining utilization trends, the service-related data received from the service inventory each time a new service is provisioned.

20. A method according to claim 15, wherein the service inventory is updated to include a new service in response to the new service being provisioned in the communications network, and wherein the provisioning of the new service includes identifying at least one network resource in the service inventory for providing the new service, generating network configuration information for configuring the at least one network resource to provide the new service, and generating a device-specific instruction for transmission to the communications network to set up the new service.

21. A non-transitory computer readable medium storing computer-readable instructions for performing a method, the method comprising:
storing a network inventory comprising information representative of a plurality of modeled entities, where each of the modeled entities represents one or more of a device of a communications network, topology data of a communications network, and service data of a communications network;
receiving at an inventory update component a plurality of change requests from a plurality of different network management applications of the system, the plurality of different network management applications including a network design application, a network resource management application, a network planning application, a service provisioning application, and a reporting application, and each of the change requests specifying a modification to be made to the communications network;
modifying one or more of the plurality of modeled entities stored in the network inventory by the inventory update component in response to the change requests;
outputting from the inventory update component to a network implementation component a plurality of change records including a first change record and a second change record based on the modification made to the network inventory in response to the change requests, where each of the plurality of change records defines a change made within the network inventory to one of the plurality of modeled entities responsive to the change requests, and where:
the first change record specifies a first modeled entity of the plurality of modeled entities, an attribute of the first modeled entity, and a first modification of the attribute of the first modeled entity in response to the change requests, where the first modeled entity includes the device of the communications network, and
the second change record specifies the first modeled entity, the attribute of the first modeled entity, and a second modification of the attribute of the first modeled entity in response to the change requests;
accumulating the plurality of change records;
processing the accumulated change records responsive to a predefined event, the predefined event being the plurality of change records having a threshold number of change records, and the processing including generating at the network implementation component a set of network configuration actions that correspond to the plurality of change records, the set of network configuration actions including configuration commands for the first modeled entity, the generating including:
combining the first change record and the second change record into a single network configuration action based on a determination that both the first change record and the second change record are associated with the first modeled entity, where the single network configuration action includes specific instructions in a predetermined format specific to the device of the communications network to be implemented by the device for configuring the device of the communications network;
transmitting the set of network configuration actions to the communications network;

implementing the set of network configuration actions at the communications network, including carrying out the specific instructions associated with the device of the communications network to perform one or more changes to the device of the communications network and in response to carrying out the specific instructions, transmitting an acknowledgement from the device to the network implementation component that the specific instructions were received including:
(i) when the one or more changes to the device are successfully completed by the device, the acknowledgement indicating that the one or more changes to the device were successfully completed, and
(ii) when the one or more changes to the device are not successfully completed by the device, the acknowledgement indicating that the one or more changes to the device were not completed; and
awaiting receipt by the network implementation component that the specific instructions were received and that the one or more changes to the device were successfully completed before proceeding with further network configuration actions that include modifications that are dependent on the one or more changes;
analyzing utilization of network resources in the communications network; and
planning changes to the communications network in dependence on the outcome of the analysis.

* * * * *